(12) United States Patent
Tange

(10) Patent No.: US 12,212,243 B2
(45) Date of Patent: Jan. 28, 2025

(54) RESONANCE OPERATION OF DC-DC CONVERTER USING A POINT-OF-LOAD INTEGRATED CIRCUIT

(71) Applicant: Murata Manufacturing Co., Ltd., Nagaokakyo (JP)

(72) Inventor: Takayuki Tange, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 204 days.

(21) Appl. No.: 17/875,696

(22) Filed: Jul. 28, 2022

(65) Prior Publication Data

US 2024/0039412 A1  Feb. 1, 2024

(51) Int. Cl.
*H02M 3/335* (2006.01)
*H02M 1/00* (2006.01)
*H02M 3/00* (2006.01)

(52) U.S. Cl.
CPC ..... *H02M 3/33553* (2013.01); *H02M 1/0003* (2021.05); *H02M 1/007* (2021.05); *H02M 3/01* (2021.05); *H02M 3/33571* (2021.05)

(58) Field of Classification Search
CPC .. H02M 3/33571; H02M 1/007; H02M 1/003; H02M 3/01
See application file for complete search history.

(56) References Cited

U.S. PATENT DOCUMENTS

| | | | |
|---|---|---|---|
| 7,558,083 B2 | 7/2009 | Schlecht | |
| 10,014,787 B2 * | 7/2018 | Chen | H02M 3/01 |
| 10,158,282 B1 * | 12/2018 | Maruyama | H02M 1/36 |
| 2003/0142513 A1 | 7/2003 | Vinciarelli | |
| 2019/0386558 A1 * | 12/2019 | Drda | H02M 1/32 |
| 2020/0195155 A1 * | 6/2020 | Colbeck | H02M 3/33571 |
| 2021/0119546 A1 | 4/2021 | Deboy et al. | |
| 2022/0123647 A1 * | 4/2022 | Mayell | H02M 1/0058 |
| 2022/0209672 A1 * | 6/2022 | Zhong | H02M 3/01 |
| 2022/0385190 A1 * | 12/2022 | Xu | H02M 3/33571 |

FOREIGN PATENT DOCUMENTS

EP  1333553 A2  8/2003

OTHER PUBLICATIONS

Texas Instruments Incorporated, "TLV6256xA 1-A, 2-A Step Down Converter with Forced PWM in SOT563 Package", TLV62568A, TLV62569A, SLVSE95B, Apr. 2018, Revised Mar. 2020, 23 pages.

* cited by examiner

*Primary Examiner* — Alex Torres-Rivera
(74) *Attorney, Agent, or Firm* — Keating & Bennett, LLP

(57) ABSTRACT

A converter includes first and second input terminals; an integrated circuit (IC) that is a non-resonant, step-down, and point-of-load IC, that is connected to the first and second input terminals, and that includes a feedback terminal and switch-output terminal; a voltage-sense circuit connected to the feedback terminal and the switch-output terminal; a transformer that includes a primary winding connected to the switch-output terminal; a capacitor connected in series with the primary winding; a rectifier connected to a secondary winding of the transformer; and first and second output terminals connected to the rectifier. The converter is operated in a resonate mode.

18 Claims, 18 Drawing Sheets

RESONANCE OPERATION OF DC-DC CONVERTER USING A POINT-OF-LOAD INTEGRATED CIRCUIT

BACKGROUND OF THE INVENTION

1. Field of the Invention

The present invention relates to converters. More specifically, the present invention relates to DC-DC converters that use a point-of-load (POL) integrated circuit (IC) to achieve resonant operation.

2. Description of the Related Art

FIG. 1 shows a known isolated DC-DC converter 300. The known isolated DC-DC converter 300 includes a primary side 302 and a secondary side 352. "Primary side" refers to circuitry connected to the inductor 308, and "secondary side" refers to circuitry connected to the inductor 354.

The known isolated DC-DC converter 300 includes a step-down IC 304. The step-down IC 304 includes an input voltage terminal VIN; an enable terminal EN that turns on the step-down IC 304 when a voltage is applied and that turns off the step-down IC 304 when no voltage is applied; a switch-output terminal SW connected to an output of a power switch or power switches; a feedback terminal FB that monitors the output of the step-down IC 304; an output-sense terminal OUT that is connected to the voltage power rail of the output voltage; and a ground terminal GND.

An input voltage $V_{IN}$ is input into the input voltage terminal VIN of the step-down IC 304, and the input voltage terminal VIN is connected to ground via a first capacitor 306. The switch-output terminal SW is connected to one end of a first inductor 308. The other end of the first inductor 308 is connected to the output-sense terminal OUT of the step-down IC 304 and is connected to ground via a first resistor 310 and a second resistor 312 connected in series. The other end of the first inductor 308 is connected to ground via a second capacitor 314 and is connected to an output terminal 316. The feedback terminal FB is connected to the midpoint between the first and second resistors 310, 312, and the ground terminal GND is connected to ground.

The primary side 302 functions as a buck converter. The output voltage $V_{OUT1}$ is set by the feedback terminal FB and the first and second resistors 310, 312. The feedback terminal FB is connected to the midpoint of the voltage divider formed by the first and second resistors 310, 312, and the voltage at the feedback terminal FB is always maintained at an internal reference voltage (for example 0.7 V) set by an internal operational amplifier in the step-down IC 304. This feedback circuit controls the switching timing (e.g., duty cycle) of each of the switches in the step-down IC 304 based on the resistance values of the first and second resistors 310, 312. The duty cycles of the internal switches set the output voltage $V_{OUT1}$ at the output terminal 316 of the primary side. The second capacitor 314 stabilizes the output voltage $V_{OUT1}$ of the primary side. The output voltage $V_{OUT1}$ at the output terminal 316 of the primary side is non-isolated.

The first inductor 308 is coupled to a second inductor 354 on the secondary side 352, such that the first inductor 308 and the second inductor 354 form a transformer. The first inductor 308 and second inductor 354 may typically be formed from coils. The first inductor 308 and the second inductor 354 are coupled via a magnetic core. The first inductor 308 forms the primary windings of the transformer and the second inductor 354 forms the secondary windings of the transformer. The secondary side 352 is electrically isolated from the primary side 302 by the transformer. The primary and secondary windings of the transformer have the same polarity.

The secondary side 352 also includes a rectifying circuit 356 and a third capacitor 360. The rectifying circuit 356 is a two-diode center-tapped full-wave rectifier that includes a first diode 362, a second diode 364, and a center-tap halfway along the second inductor 354 which is connected to ground. The anode of the first diode 362 and the anode of the second diode 364 are connected to either end of the second inductor 354. The cathode of the first diode 362 and the cathode of the second diode 364 are connected to one end of the third capacitor. The third capacitor 360 is connected between the output and ground. The voltage over the third capacitor 360 is the isolated output voltage $V_{OUT2}$ of the isolated DC-DC converter 300. The isolated DC-DC converter 300 therefore includes two independent outputs. The first is the non-isolated stepped down output voltage $V_{OUT1}$ of the buck converter of the primary side 302 at the output terminal 316. The second output is the output voltage $V_{OUT2}$ of the secondary side 352 that is isolated by virtue of the transformer.

The isolated DC-DC converter 300 includes a duty regulating circuit 380. The duty regulating circuit 380 includes an amplifying circuit. The amplifying circuit is an operational amplifier (OP amp) 382. The non-inverting input and the positive power supply terminal of the OP amp 382 are connected to the output of the first inductor 308 of the primary side 302. The non-isolated output voltage $V_{OUT1}$ of the primary side buck converter (at the output terminal 316) is input into the non-inverting input and the positive power supply terminal of the OP amp 382. The negative power supply terminal of the OP amp 382 is connected to ground. The non-inverting input of the OP amp 382 is connected to ground via a fourth capacitor 384. The inverting input of the OP amp 382 is connected to ground via a third resistor 386 and is connected to the input voltage terminal VIN of the step-down IC 304 via a fourth resistor 388. The output terminal of the OP amp 382 is connected to the midpoint of the third resistor 386 and the fourth resistor 388, and therefore to the inverting input of the OP amp 382, via fifth capacitor 390. The output terminal of the OP amp 382 is also connected to the midpoint of the first and second resistors 310, 312 of the primary side 302 via a fifth resistor 392.

The duty regulating circuit 380 is included to maintain the duty cycle of the step-down IC 304 at 50%, including when the input voltage $V_{IN}$ is changed. The OP amp 382 of the duty regulating circuit monitors the input voltage $V_{IN}$ and the output voltage $V_{OUT1}$ of the primary side 302. The inverting input of the OP amp 382 receives half of the input voltage $V_{IN}$, the input voltage $V_{IN}$ being divided equally between the third and fourth resistors 386, 388. The non-inverting input receives the output voltage $V_{OUT1}$. The OP amp 382 outputs a feedback signal into the feedback terminal FB via the fifth resistor 392, which maintains the duty cycle of the step-down IC 304 at 50%, and therefore ensures the output voltage $V_{OUT1}$ is equal to half of the input voltage, even when the input voltage is varied.

When the duty regulating circuit 380 maintains the duty cycle of the step-down IC 304 at 50%, and the first inductor 308 has the same number of turns as each half of the second inductor 354 (the transformer ratio is equal to 1), and the transformer is well coupled, the output voltage $V_{OUT2}$ of the secondary side 352 is stable without an inductor on the secondary side. Therefore, an inductor on the secondary side 352 is not required, although it may optionally be included. Without an inductor on the secondary side 352, the third capacitor 360 alone forms the filter circuit.

FIG. 2 shows the relationship between the output voltage and the output current of the known isolated DC-DC converter 300 of FIG. 1. As seen in FIG. 2, the hard-switching topology of the known isolated DC-DC converter 300 of FIG. 1 has worse load regulation because of the poor coupling of the transformer of the known isolated DC-DC converter 300. In FIG. 1, the coupling of the transformer is 0.948, and the transformer ratio is 6T:14T. Voltage accuracy depends on the transformer ratio in the known isolated DC-DC converter 300 because any difference in the voltage is multiplied by the transformer turn ratio.

The known isolated DC-DC converter 300 includes line regulation but not load regulation so that the output voltage varies with the input voltage variation and so that the known isolated DC-DC converter 300 cannot receive a wide input voltage such as 5 V-24 V.

A resonance topology used in an LLC converter has been used to address these problems. But a dedicated IC used with the resonance topology is too expensive. And no such IC exists that can be used with low power applications (e.g., 1 W-5 W output power).

The load regulation of the converter can be improved by using a transformer with better coupling, but it is difficult to achieve sufficient coupling in a transformer without complex structures to maintain a proper isolation barrier.

Line regulation can be improved by controlling the duty cycle. But controlling the duty cycle requires primary or secondary voltage monitoring.

SUMMARY OF THE INVENTION

To overcome the problems described above, preferred embodiments of the present invention provide DC-DC converters that use resonance operation with a POL IC. Each DC-DC converter can achieve reasonable load regulation in a low-power unregulated converter, good voltage accuracy without sensing any voltage, no line regulation, and receiver a wide input voltage range.

According to a preferred embodiment of the present invention, a converter includes first and second input terminals; an integrated circuit (IC) that is a non-resonant, step-down, and point-of-load IC, that is connected to the first and second input terminals, and that includes a feedback terminal and switch-output terminal; a voltage-sense circuit connected to the feedback terminal and the switch-output terminal; a transformer that includes a primary winding connected to the switch-output terminal; a capacitor connected in series with the primary winding; a rectifier connected to a secondary winding of the transformer; and first and second output terminals connected to the rectifier. The converter is operated in a resonate mode.

The voltage-sense circuit can include a voltage divider defined by first and second resistors connected in series with each other; the first resistor can be directly connected to the switch-output terminal; and a node between the first and the second resistors can be connected to the feedback terminal. A signal received by the feedback terminal from the voltage-sense circuit causes the IC to provide a 50% duty cycle or an approximately 50% duty cycle. A resonant circuit can be defined by a leakage inductance of the primary winding and the capacitor resonates.

The converter can further include a pre-regulator connected to the first and the second input terminals. The pre-regulator can include an IC that includes a feedback terminal and switch-output terminal, and a voltage-sense circuit that is connected to the switch-output terminal through an inductor and that is connected to the feedback terminal. The converter can further include a load compensation circuit. The converter can further include a feedback circuit connected to the first and the second output terminals and connected to the IC of the pre-regulator. The feedback circuit can include an optocoupler. The optocoupler can include a photo transistor and a light-emitting diode. The optocoupler can include first and second capacitors. The feedback circuit can include an IC connected to the first and the second output terminals.

The converter can further include an additional IC that is a non-resonant, step-down, and point-of-load IC, that is connected to the first and second input terminals, and that includes a feedback terminal and switch-output terminal. The IC and the additional IC can be arranged in a phase-shift, full-bridge topology.

The rectifier can be a full-bridge rectifier. The full-bridge rectifier can be connected to an inductor. The rectifier can include a voltage-doubler circuit or a voltage-quadrupler circuit. The converter can further include a capacitive divider connected to the primary windings.

According to a preferred embodiment of the present invention, a converter includes first and second input terminals; an integrated circuit (IC) that is a non-resonant, step-down, and point-of-load IC, that is connected to the first and second input terminals, and that includes a feedback terminal and switch-output terminal; a voltage-sense circuit that is connected to the feedback terminal and that is directly connected to the switch-output terminal; a transformer that includes a primary winding connected to the switch-output terminal; a capacitor connected in series with the primary winding; a rectifier connected to a secondary winding of the transformer; and first and second output terminals connected to the rectifier.

The voltage-sense circuit can include a voltage divider defined by first and second resistors connected in series with each other; the first resistor can be directly connected to the switch-output terminal; and a node between the first and the second resistors can be connected to the feedback terminal. The converter can further include an inductor connected to the rectifier.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 3:
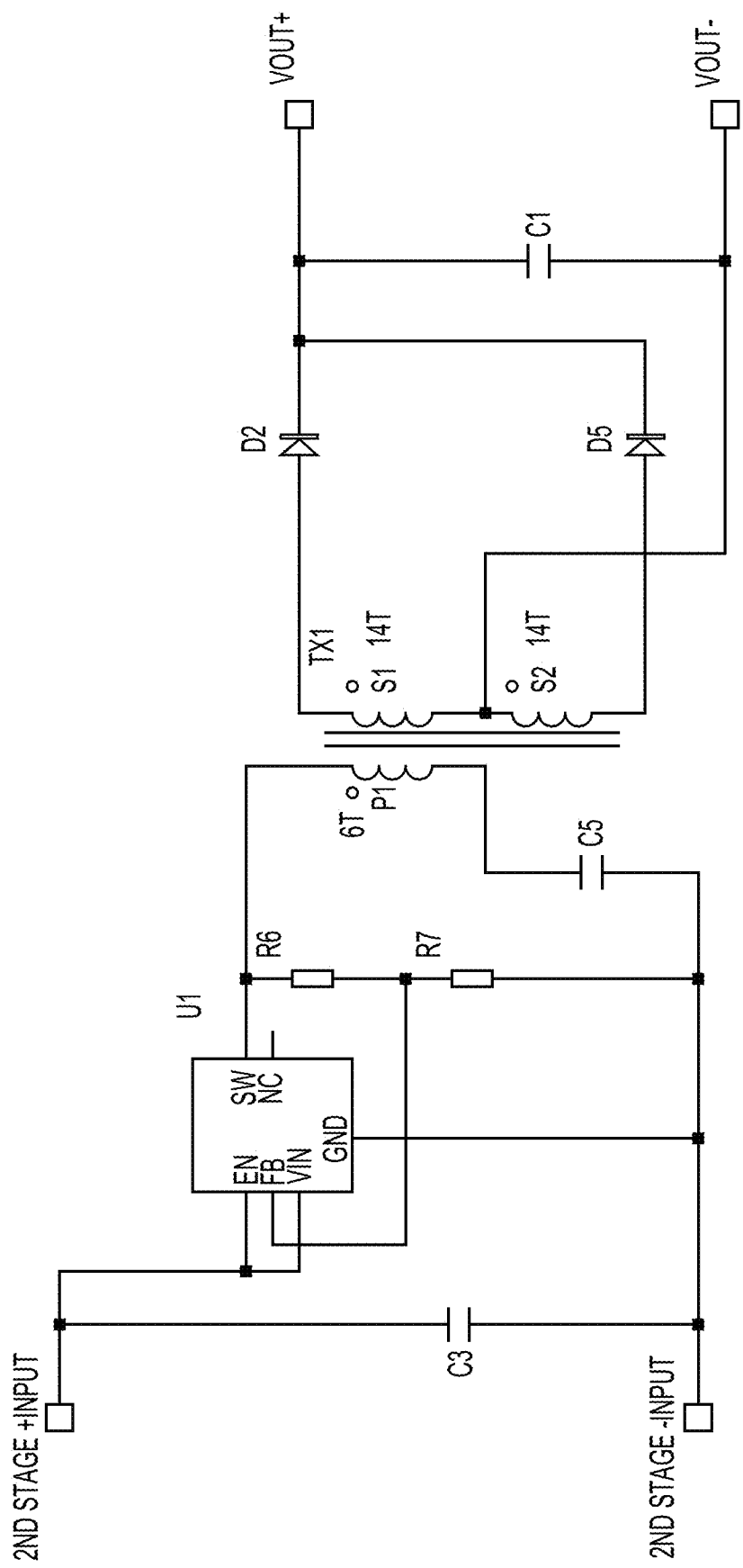
FIG. 3 shows a second stage of a converter with a feedback terminal of a POL IC connected to a switching-node terminal of the POL IC.

FIG. 3 shows a second stage of a converter. The second stage includes a transformer TX1 that divides the second stage into a primary side (on the left side of FIG. 3) and a secondary side (on the right side of FIG. 3). The transformer TX1 includes a primary winding P1 and two secondary windings TX1, TX2. As shown in FIG. 3, the primary winding P1 can include 6 turns, and the secondary windings S1, S2 can include 14 turns. The primary winding P1 and the secondary windings S1, S2 can have any number of turns.

The primary side of the second stage includes an IC U1 that includes a power switch or power switches. The IC U1 includes an input voltage terminal VIN; an enable terminal EN that turns on the IC U1 when a voltage is applied and that turns off the IC U1 when no voltage is applied; a switch-output terminal SW connected to an output of the power switch or the power switches; a feedback terminal FB that monitors the output of the IC U1; and a ground terminal GND. The IC U1 can include a not-connected terminal NC that is not connected to any other element of the converter. The not-connected terminal NC can be allowed to float.

The primary side of the second stage can include input terminals +input, −input that are connected to input capacitor C3. The input terminal +input and a first terminal of the input capacitor C3 can be connected to the input voltage terminal VIN and the enable terminal EN. The input terminal −input and a second terminal of the input capacitor C3 can be connected to the ground terminal GND. The switch-output terminal SW can be connected to the primary winding P1. The primary winding P1 can be connected in series with a capacitor C5. The feedback terminal FB can be connected to the switch-output terminal SW. The feedback terminal FB can be connected to the switch-output terminal SW before any inductor or LC filter connected to the switch-output terminal. As shown in FIG. 3, the feedback terminal FB can be connected to the switch-output terminal SW through a voltage divider defined by resistors R6, R7 that are connected in series across the switch-output terminal SW and the input terminal −input.

The IC U1 can be a non-resonant, step-down POL IC, which can include an internal high-side power switch and an internal low-side power switch connected in series with other and connected to the input voltage and which can include a forced continuous-conduction mode (CCM) function that allows negative current to flow into the internal low-side switch. Some POL ICs include discontinuous mode (DCM) at light-load conditions to improve efficiency by preventing negative current. Usually, the POL IC detects negative current in the inductor by detecting a voltage drop in the low-side switch. Once the POL IC detects the negative voltage drop, the switch is turned off to prevent negative current into the switch. On the other hand, if POL IC is used in an isolated half-bridge converter, the flow of the inductor current is negative in each cycle. If POL IC includes DCM function, the negative current is prevented by DCM control, preventing the converter from working properly. Based on a feedback signal of the output voltage, the non-resonant, step-down POL IC can regulate the output voltage by changing the duty cycle of the internal high-side and low-side power switches. An example of a non-resonant, step-down POL IC that can be used is Texas Instruments' TLV62568A as described in the datasheet: Texas Instruments, "TLV6256xA 1-A, 2-A Step Down Converter with Forced PWM in SOT563 Package," revised March 2020, 23 pages, which is incorporated herein by reference in its entirety. The IC U1 does not have to include pulse frequency modulation (PFM) control at light loads (or the ability to disable PFM control), a pulse-skipping mode, or any light-load efficiency-improvement feature.

Figure 1:
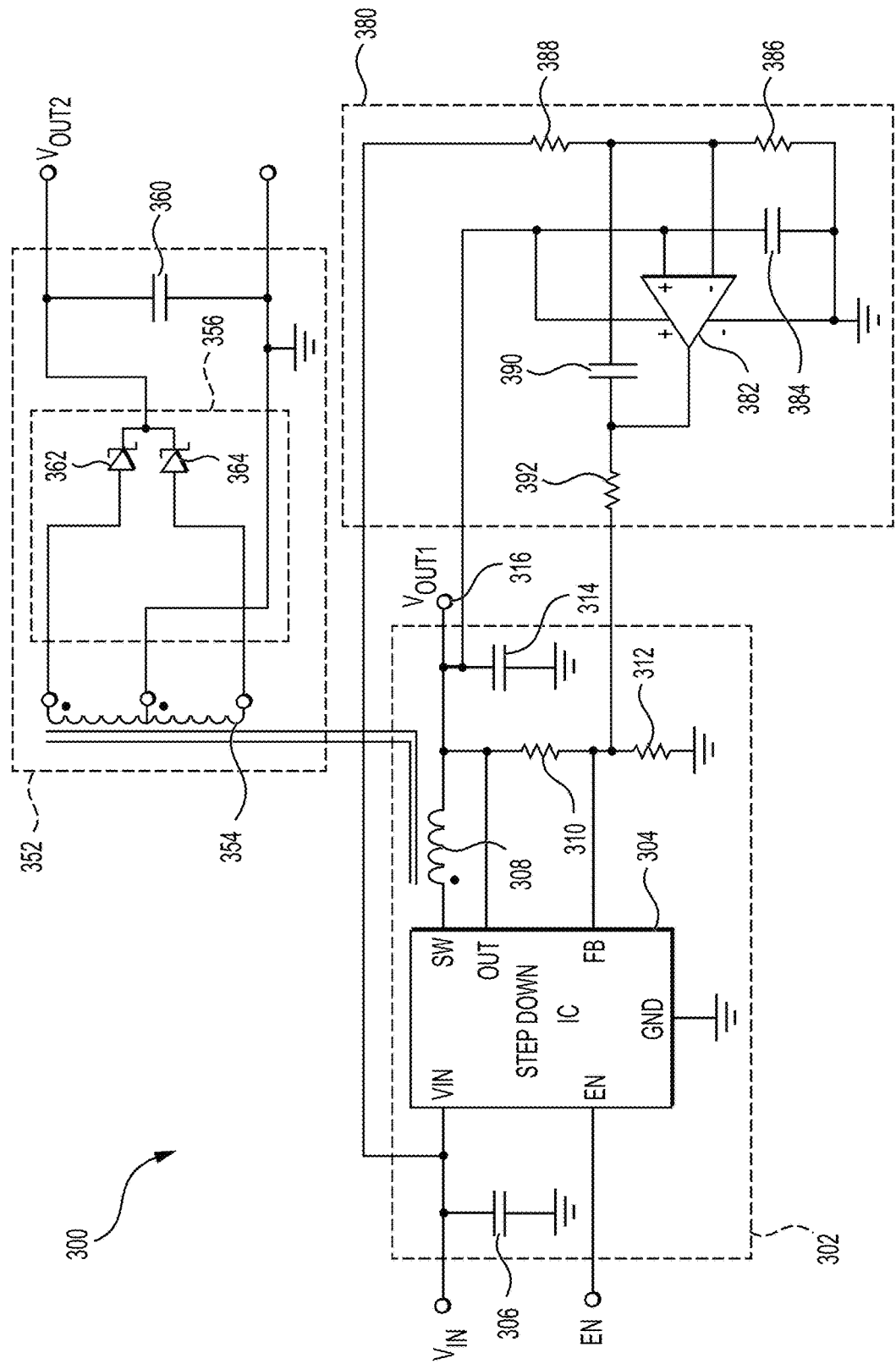
FIG. 1 shows a known isolated DC-DC converter.
Figure 4:
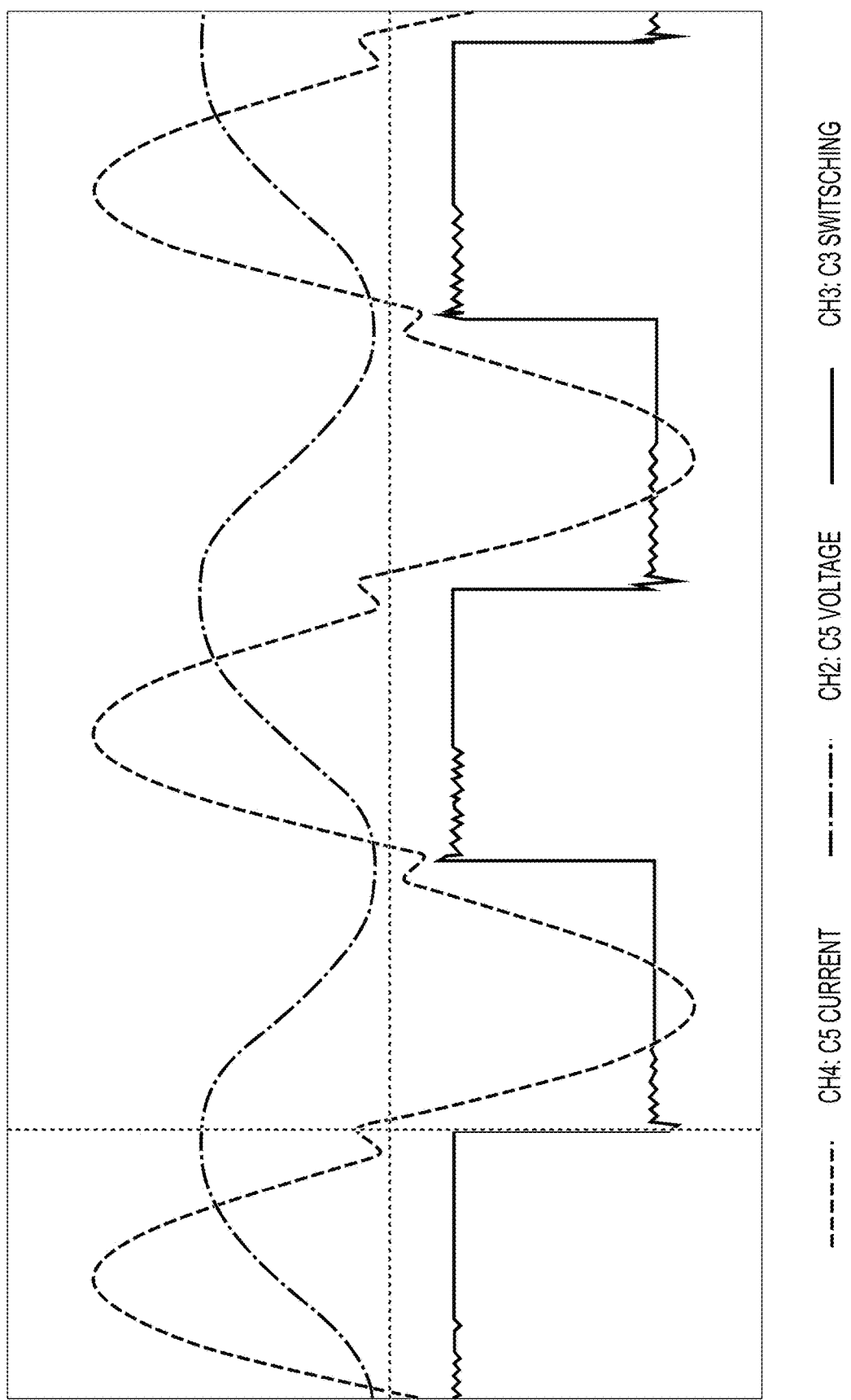
FIG. 4 shows various waveforms of the converter of FIG. 3.
Figure 5:
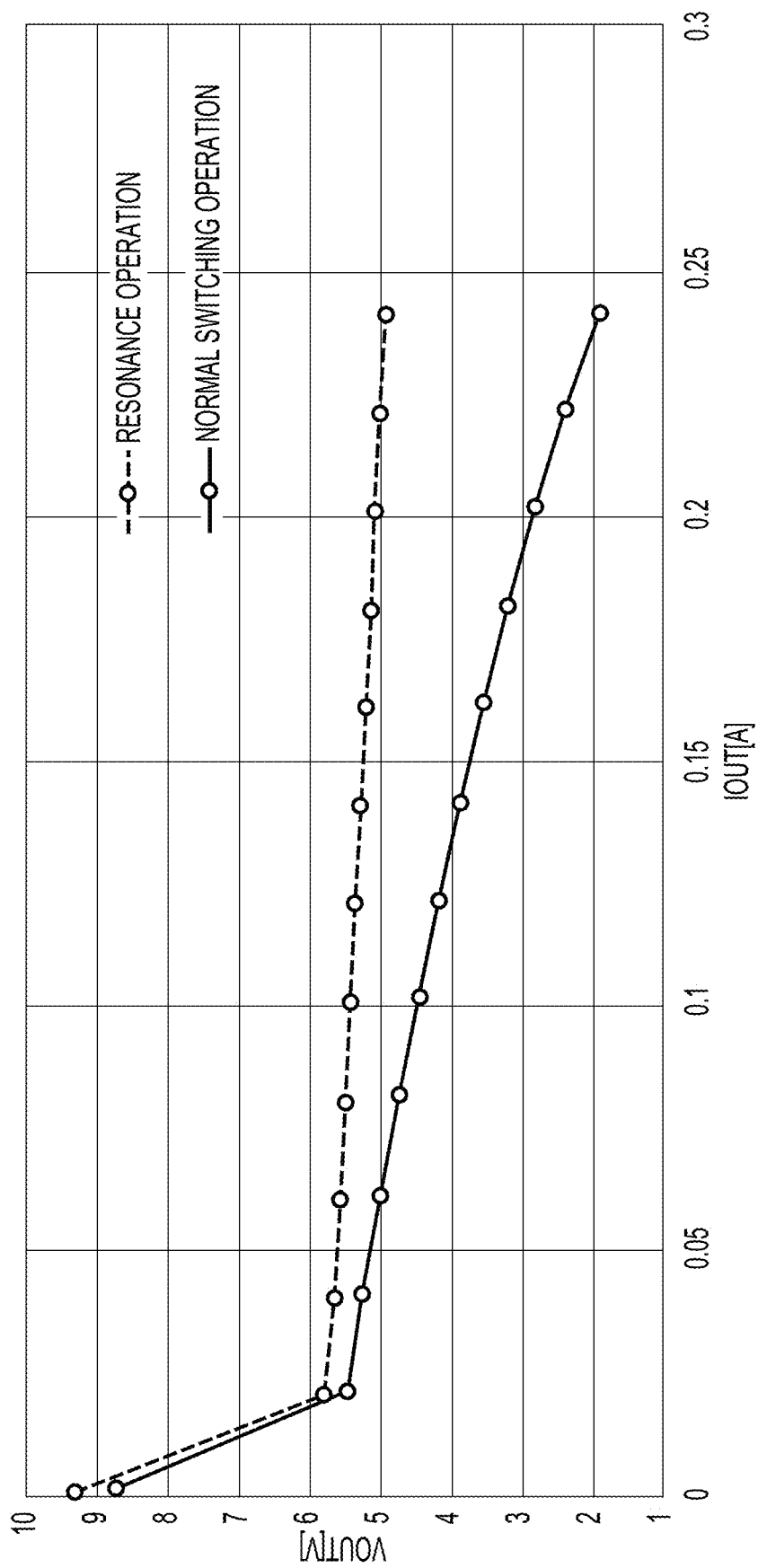
FIG. 5 shows the relationship between the output current and the output voltage during resonance operation and during normal switching operation.

Conventionally, the feedback terminal FB is connected to the capacitor C5 after an inductor and through a resistor, as shown in FIG. 1. But the feedback terminal FB in the second stage of the converter shown in FIG. 3 is connected to the switch-output terminal SW through a voltage-sense circuit that can include a voltage divider defined by the resistors R6, R7, where the resistor R6 can be directly connected to the switch-output terminal SW and before any inductor or transformer winding that receives the output of the switch-output terminal SW. An average of the voltage at the switch-output terminal SW voltage is maintained by the voltage divider defined by resistors R6, R7, keeping constant the voltage on the feedback terminal FB. The IC U1 can include an internal operational amplifier (OP amp) (not shown) that includes a plus terminal connected to a reference voltage and a negative terminal connected to the node between the resistors R6, R7 through the feedback terminal FB. When the reference voltage applied to the plus terminal and the voltage on the feedback terminal applied to the negative terminal are the same, the plus and negative terminals of the internal OP amp can be considered to be imaginarily shorted. Connecting the feedback terminal FB to the switch-output terminal SW can achieve 50% duty cycle operation which is required in resonance operation. Exact 50% duty cycle is not required. Approximately 50% duty cycle, e.g., 47.5%-52.5% duty cycle, can still be used to achieve resonance operation. Resonance operation avoids instability issues that are normally caused by the LC filter defined by the primary winding P1 and the capacitor C5 because of less gain and phase margin in the control loop. The LC filter defined by the primary winding P1 and the capacitor C5 includes an 180°-phase shift and an increased gain at the resonant frequency. If the gain with a 180°-phase shift of the LC filter defined by the primary winding P1 and the capacitor C5 is too large, then the convertor can oscillate. Using a non-resonant step-down POL IC as shown in FIG. 3 can eliminate or significantly reduce the effect that the LC filter defined by the primary winding P1 and the capacitor C5 on the control of the converter. The switching frequency of the IC U1 can be matched to the resonance frequency of a resonant circuit defined by the leakage inductance of the primary winding P1 and the capacitance of the capacitor C5 by adjusting the values of the leakage inductance of the primary winding P1 and the capacitance of the capacitor C5. FIG. 4 shows resonant waveforms in the second stage of FIG. 3 when the feedback terminal FB is connected to the switch-output terminal, where the voltage across the capacitor C5 is about 5 V, within manufacturing and/or measurement tolerances, and where the output current Iout is about 0.2 A, within manufacturing and/or measurement tolerances. Load regulation of the second stage can be improved, as shown in FIG. 5, by about 12%, within manufacturing and/or measurement tolerances.

Figure 6:
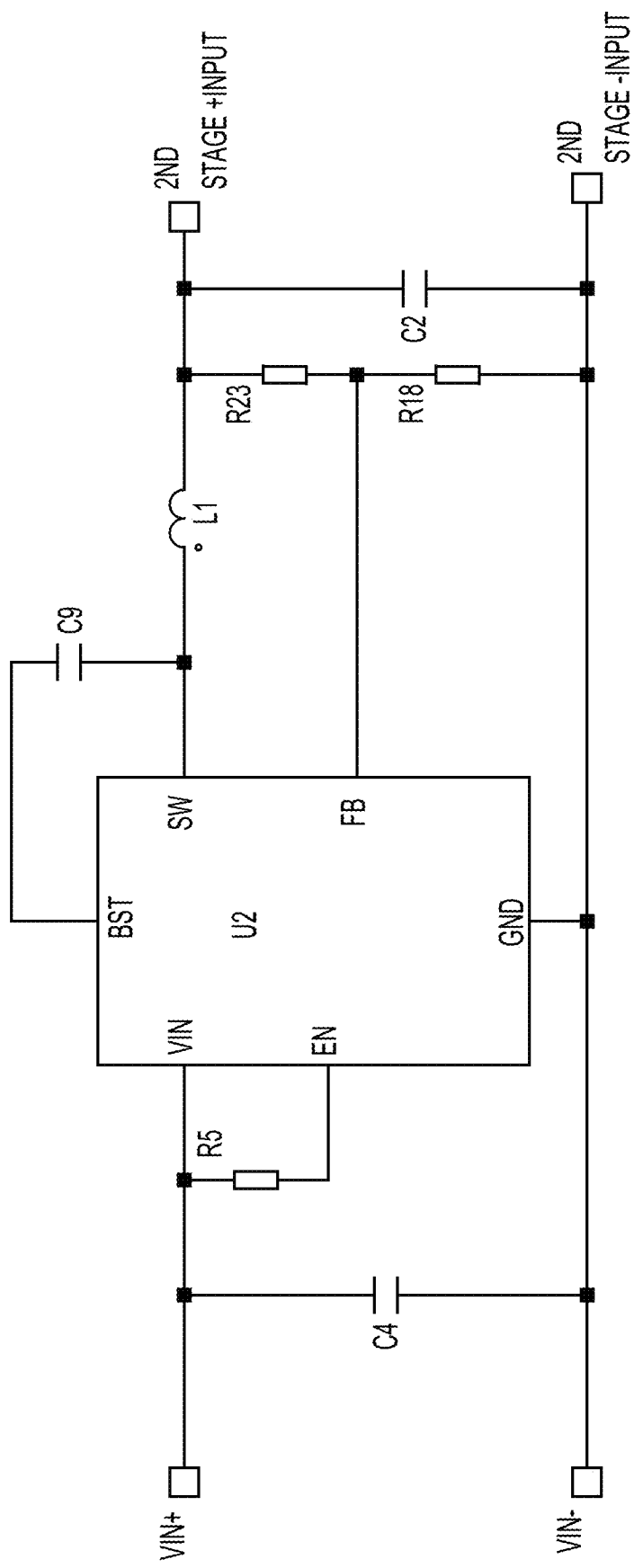
FIG. 6 shows a first stage of a converter that can be used with the second stage shown in FIG. 3.

FIG. 6 is a first stage of a converter that can be used with the second stage of FIG. 3 as a pre-regulator. The first stage can be used to reduce fluctuations in the input voltage provided to the second stage. The first stage includes an IC U2 that includes a power switch or power switches. The IC U2 includes an input voltage terminal VIN; an enable terminal EN that turns on the IC U2 when a voltage is applied and that turns off the IC U2 when no voltage is applied; a switch-output terminal SW connected to an output of the power switch or the power switches; a feedback terminal FB; a bootstrap terminal BST that can be connected to the switch-output terminal SW through capacitor C9; and a ground terminal GND.

The first stage can include input terminals +input, −input and output terminals +input and −input that are connected to the second stage. The input terminals +input, −input are connected to input capacitor C4. The input terminal +input and a first terminal of the input capacitor C4 can be connected to the input voltage terminal VIN and can be connected to the enable terminal EN through resistor R5. The output terminal −input and a second terminal of the input capacitor C4 can be connected to the ground terminal GND and to the output terminal −input. The switch-output terminal SW can be connected to an output capacitor C2 and the output terminal +input through inductor L1. The feedback terminal FB can be connected to a node between the inductor L1 and the output terminal +input by a voltage divider defined by resistors R23, R18 that are connected in series across the node between the inductor L1 and the output terminal +input and the output terminal −input.

The IC U2 can be a step-down IC. The IC U2 can accept a wide input voltage, e.g. about 4.5 V to about 24 V, within manufacturing and/or measurement tolerances, and can provide a fixed output voltage of the first stage that is provided to the second stage (i.e., the fixed input voltage received by the second stage) so that the second stage maintains a 50% duty cycle, which allows resonance operation in the second stage. Allowing the second stage to maintain a 50% duty cycle can eliminate the need for line regulation in the second stage as shown in FIG. 7 and can achieve constant output voltage with wide input voltage. In addition, the output voltage accuracy can be set both by adjusting the transformer ratio and by adjusting the output voltage of the second stage. The output voltage of the first stage (i.e., the input voltage of the second stage) can be set accurately by the voltage divider defined by resistors R23, R18. The resistors R6, R7 in the second stage can be adjusted in accordance the input voltage of the second stage to keep 50% duty cycle and thus resonance operation.

Figure 7A:
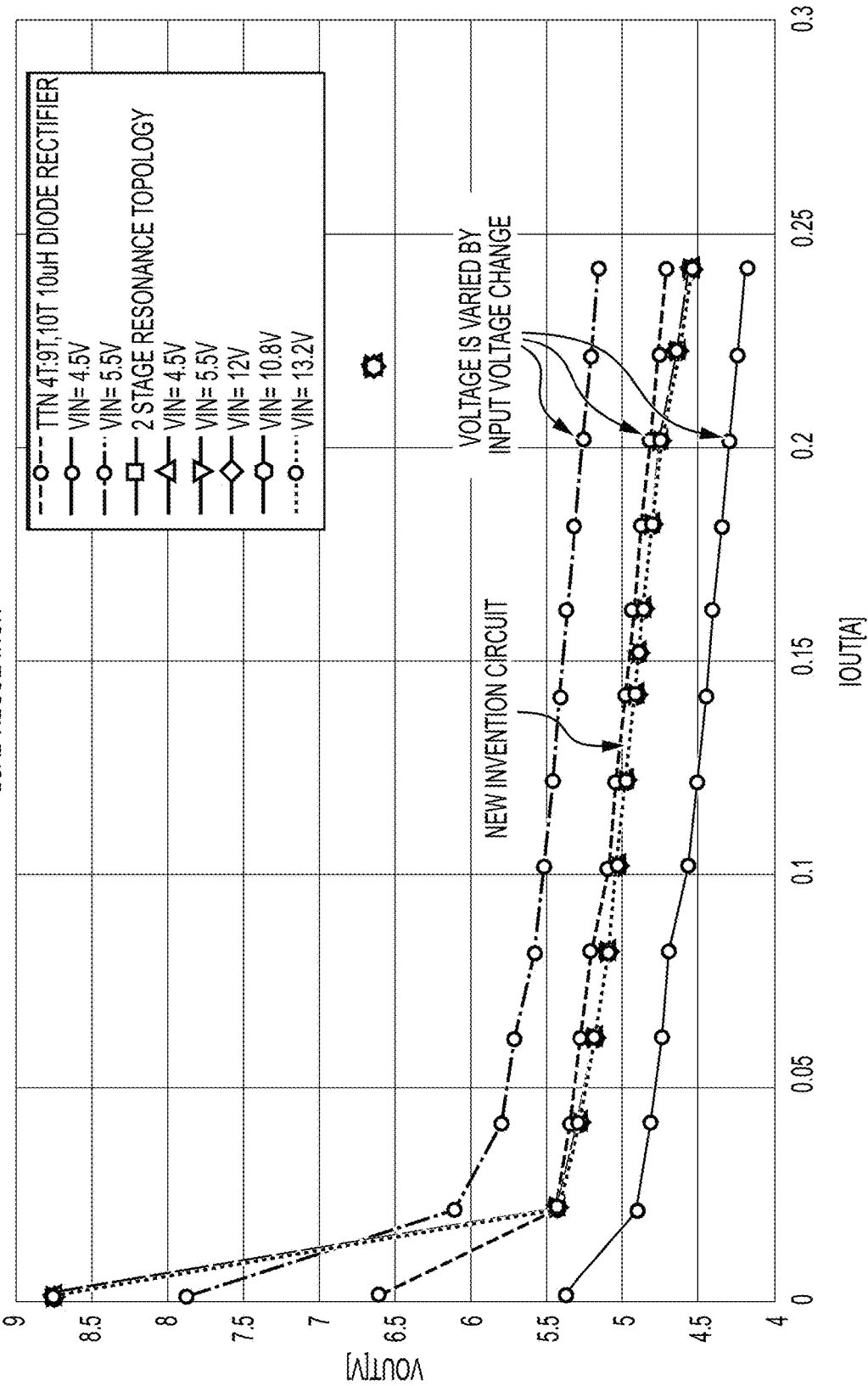
FIG. 7A shows load regulation of the two-stage resonant converter of FIGS. 3 and 6 and of the known isolated DC-DC converter of FIG. 1.
Figure 7B:
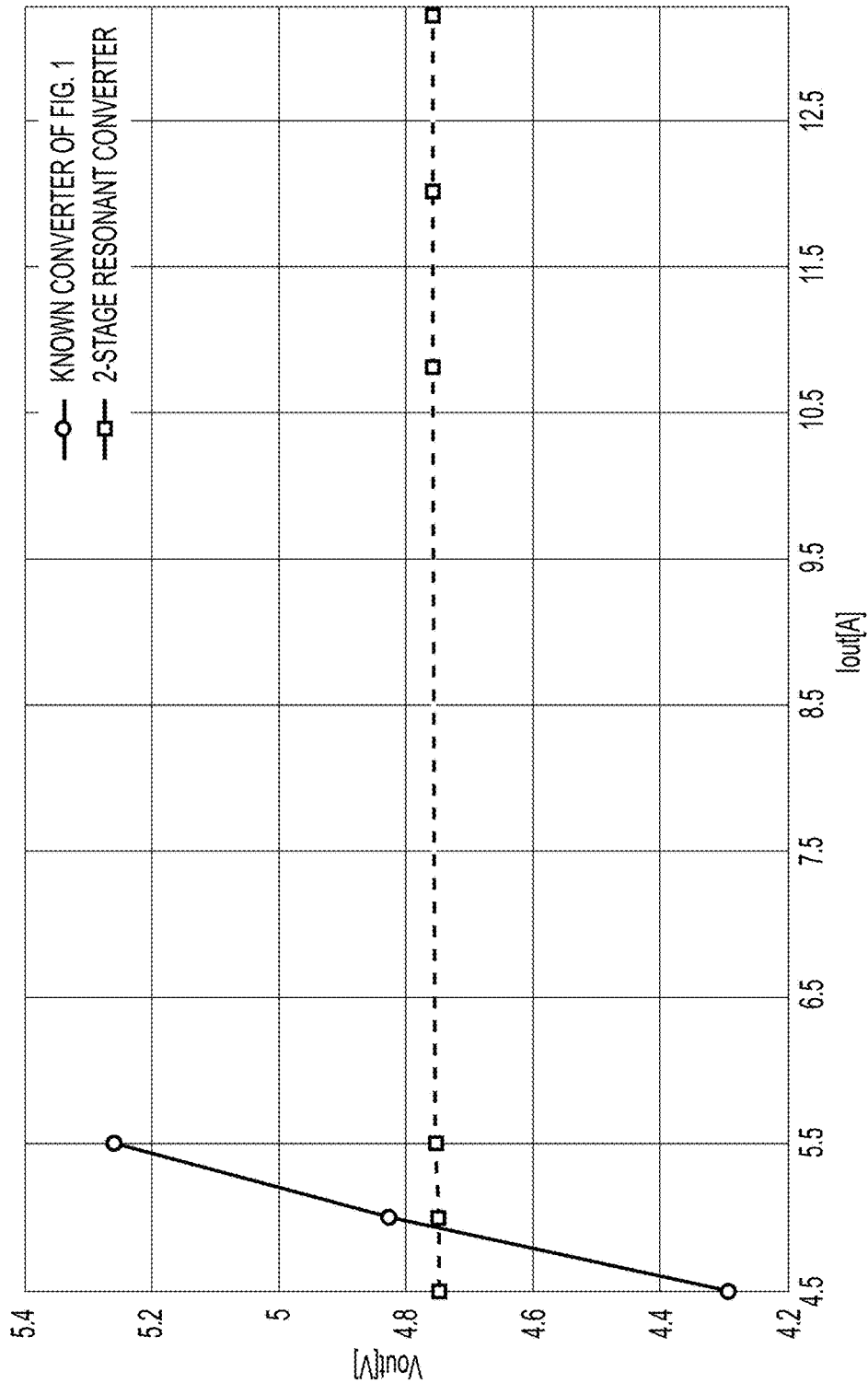
FIG. 7B shows line regulation of the two-stage resonant converter shown of FIGS. 3 and 6 and of the known isolated DC-DC converter of FIG. 1.

FIG. 7A shows the load regulation of a two-stage resonant converter with the first stage of FIG. 6 and the second stage of FIG. 3 and of the known converter of FIG. 1 at various input voltages. FIG. 7B shows the line regulation of the two-stage resonant converter with the first stage of FIG. 6 and the second stage of FIG. 3 and of the known converter of FIG. 1.

Figure 8:
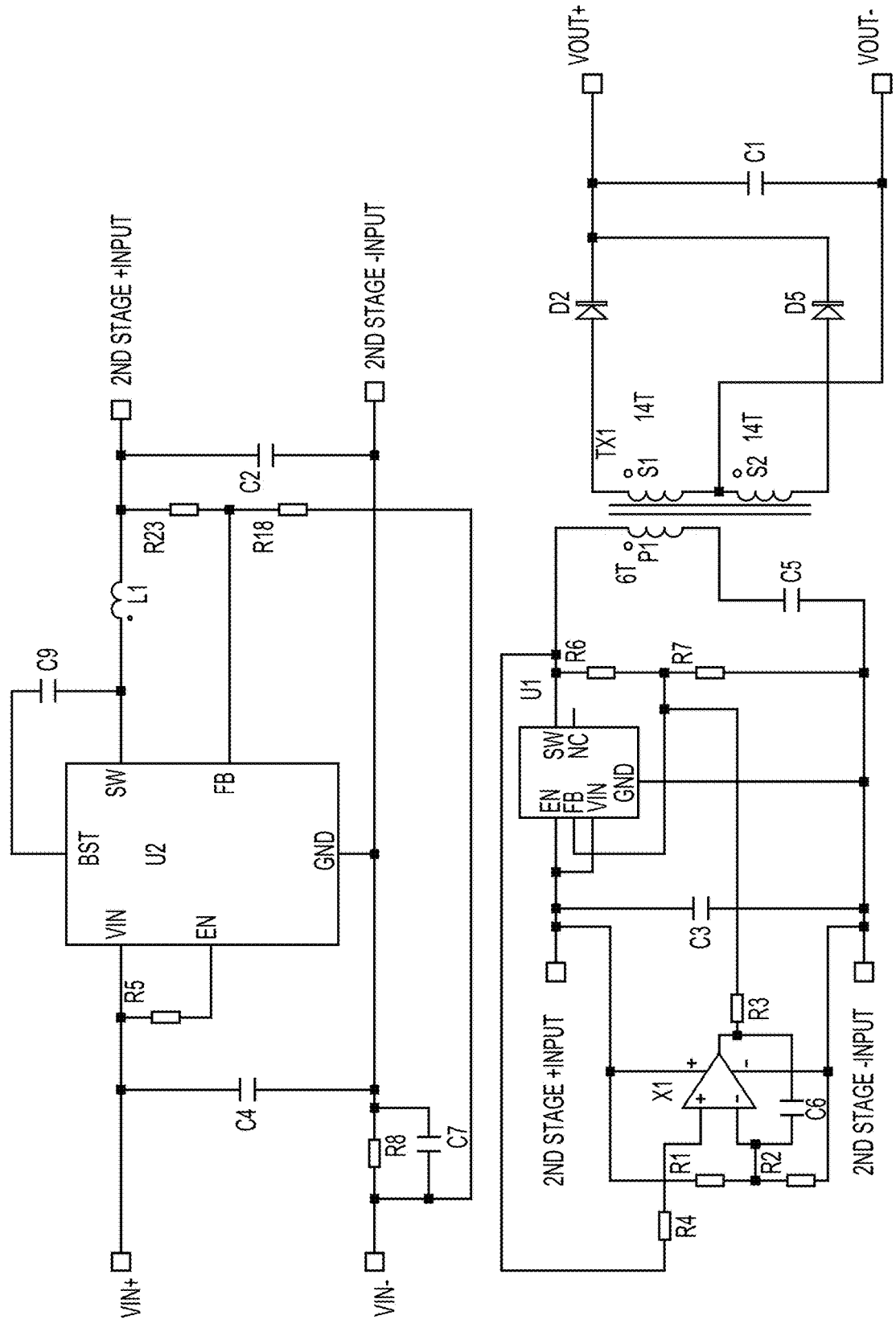
FIG. 8 shows a converter with first and second stages with a load-compensation circuit.

FIG. 8 shows first and second stages of a converter with a load-compensation circuit. The first stage at the top of FIG. 8 is similar to the first stage of FIG. 6, and the second stage at the bottom of FIG. 8 is similar to the second stage of FIG. 3. Similar elements and components in the first stages shown in FIGS. 6 and 8 and in the second stages shown in FIGS. 3 and 8 are labeled with the same reference numbers, and a description of the similar elements and components is omitted here.

The first stage of FIG. 8 additionally includes a compensation circuit including a resistor R8 and a capacitor C7 connected in parallel with each other and between the input terminal Vin− and the output terminal −input. A first end of the resistor R8 and a first end of the capacitor C7 can be connected to the input terminal Vin−, and a second end of the resistor R8 and the second end of the capacitor C7 can be connected to the output terminal −input. The voltage divider defined by resistors R23, R18 is connected to a node between the input terminal Vin− and the load compensation circuit. The current through resistor R8 can have a pulsed waveform without the capacitor C7. The capacitor C7 filters the pulsed waveform into DC voltage to affect the voltage from the voltage divider defined by resistors R23, R18.

The second stage of FIG. 8 additionally includes an operational amplifier (OP amp) X1 and peripheral circuitry. The noninverting input of the OP amp X1 is connected to the switch-output terminal SW through resistor R4, and the inverting input of the OP amp X1 is connected to the input terminal +input through a voltage divider defined by resistors R1, R2 that are connected in parallel with each other between the input terminals +input, −input. The positive power-supply voltage of the OP amp X1 is connected to the input terminal +input, and the negative power-supply voltage of the OP amp X1 is connected to the input terminal −input. Resistor R3 is connected to the output of the OP amp X1 and to the feedback terminal FB. In FIG. 8, the OP amp X1 is connected across the switch-output terminal SW and the input terminal −input to amplify the difference between the signal of the switch-output terminal SW and the divided voltage signal between the input terminals +input, −input at the node between the resistors R1, R2 to maintain a fixed duty cycle for any condition on the input terminal +input. The capacitor C6 is included in the feedback circuit to help stabilize the control of the IC U1. The resistors R3, R4 are the output gain control resistors of the OP amp X1 to adjust the gain of the OP amp X1. Resistor R4 prevents large currents being applied to non-inverting input of the OP amp X1, i.e., resistor R4 is an output gain control resistor.

The input voltage of the second stage can be adjusted by the input current detected by the resistor R8 in the first stage. When the output current increases, the voltage drop across the resistor R8 also increases when the input current increases. The resistor R8 is connected to the resistor R18 included in the voltage divider defined by resistors R23, R18. The input voltage of the second stage increases in accordance with an increase in the voltage drop across resistor R8. To keep 50% duty cycle in the second stage, the OP amp X1 and peripheral circuitry discussed above can be used. The OP amp X1 monitors the input terminal +input using the voltage divider defined by resistors R1, R2 and provides a signal to the feedback terminal of the IC U1. By using the load-compensation circuit in the first stage and the OP amp X1 in the second stage, even though the input of the second stage input is increased by the input current, the second stage maintains a 50% duty cycle, compensating for any output-voltage drop. Compensation gain is controlled by the value of the resistor R8.

Figure 9:
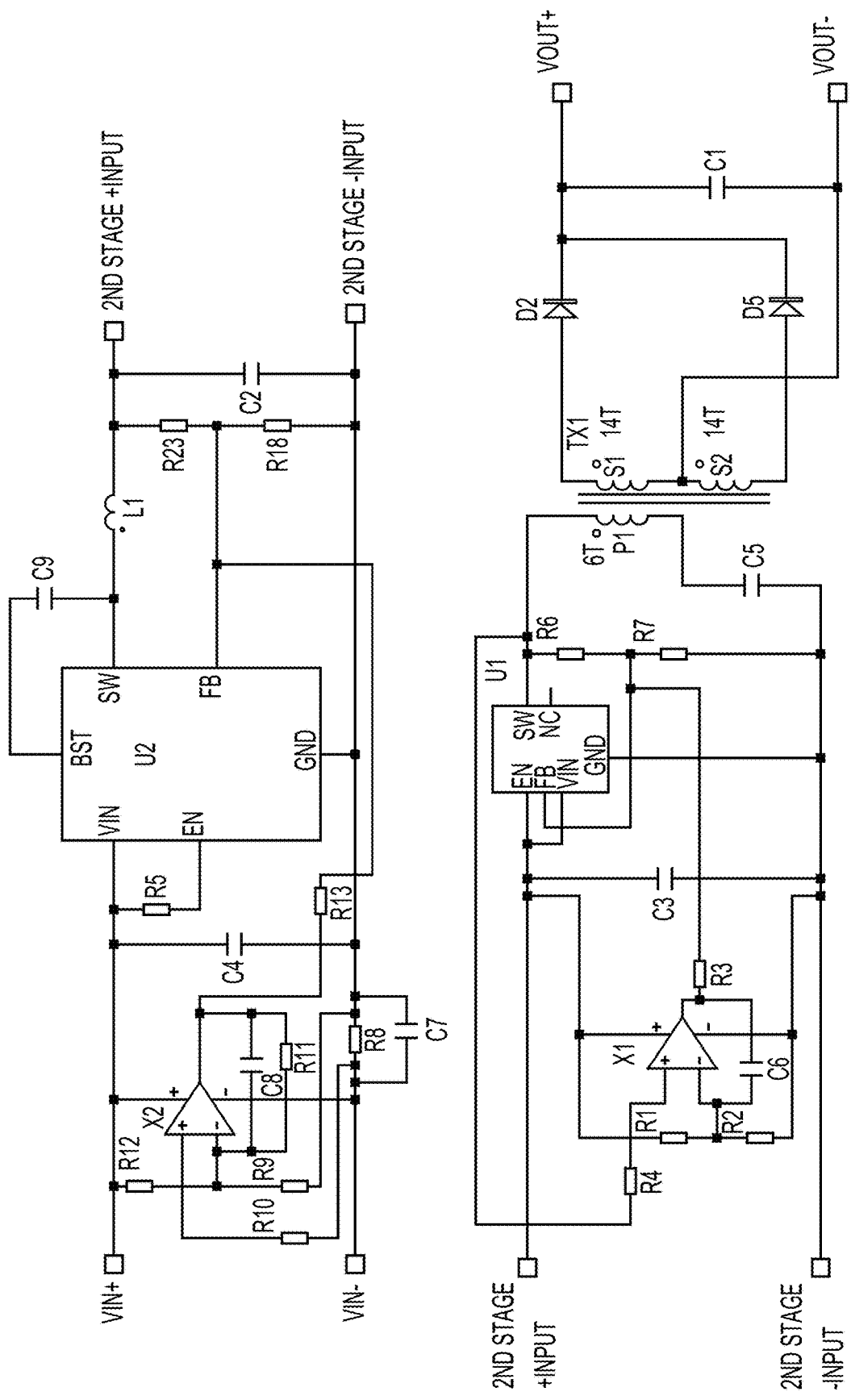
FIG. 9 shows a converter with first and second stages with an operational-amplifier (OP-amp) load-compensation circuit.

FIG. 9 shows first and second stages of a converter with an OP-amp load-compensation circuit in the first stage. The converter in FIG. 9 is similar to the converter in FIG. 8 except that the load-compensation circuits in the first stages of the converters are different. Similar elements and components in the converter shown in FIGS. 8 and 9 are labeled with the same reference numbers, and a description of the similar elements and components is omitted here.

The first stage in FIG. 9 includes an additional OP amp X2 in the load-compensation circuit connected across the resistor R8. Because the OP amp X2 amplifies the signal across the resistor R8, the resistance of the resistor R8 can be smaller, reducing losses. The compensation gain is controlled by the gain of the OP amp X2. The OP amp X2 includes two inputs connected across the resistor R8. The noninverting input of the OP amp X2 is connected to the first end of the resistor R8 and the input terminal Vin− through resistor R10, and the inverting input of the OP amp X2 is connected to the second end of the resistor R8 through resistor R9, is connected to input terminal Vin+ through resistor R12, and is connected to the output of the OP amp X2 through the resistor R11 and the capacitor C8. The positive power-supply voltage of the OP amp X2 is connected to the input terminal Vin+, and the negative power-supply voltage of the OP amp X2 is connected to the input terminal Vin−. Resistor R13 is connected to the output of the OP amp X2 and to the feedback terminal FB. In FIG. 9, the OP amp X2 is connected across the resistor R8 to amplify the signal across the resistor R8, reducing the loss from resistor R8. The capacitors C8 and C7 are included in the feedback circuit to help stabilize the control of the IC U2.

Figure 10:
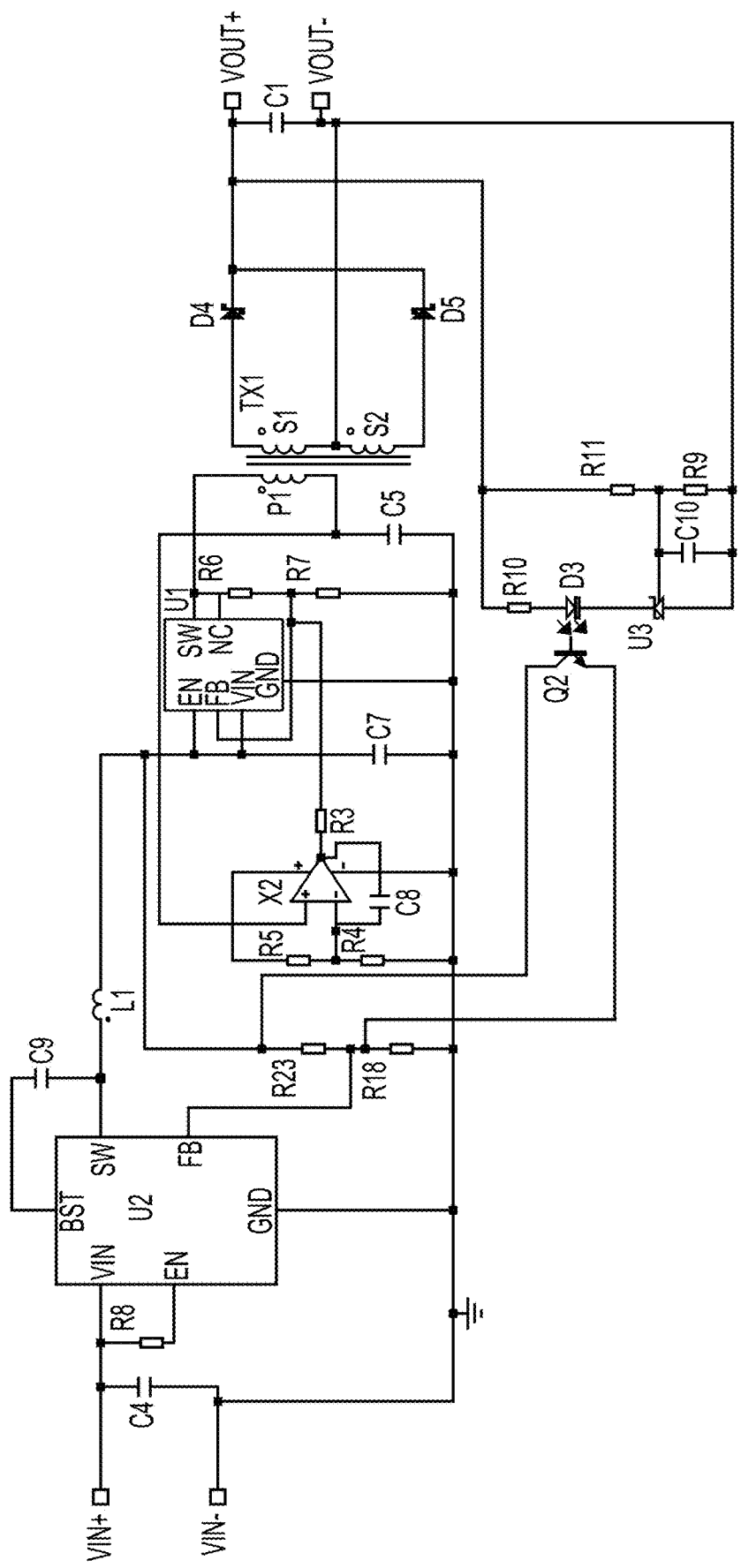
FIG. 10 shows a converter with first and second stages in which the first stage uses a feedback optocoupler to regulate the output voltage.

FIG. 10 shows first and second stages of a converter that uses a feedback optocoupler to regulate the output voltage. The first stage of FIG. 10 is similar to the first stage of FIG. 6, except that the capacitor C7 is used in the first stage of FIG. 10 instead of the output capacitor C2 in the first stage of FIG. 6. The second stage of FIG. 10 is similar to the second stage of FIG. 8, except that the capacitor C7 is used in the second stage of FIG. 10 instead of the input capacitor C3 in the second stage of FIG. 8. That is, in FIG. 10, the capacitor C7 replaces both of the output capacitor C2 in FIG. 6 and the input capacitor C3 in FIG. 3. Similarly, the capacitors C2 and C3 in FIGS. 3 and 6, in FIG. 8, and in FIG. 9 can be combined into a single capacitor. In addition, in the second stage, the OP amp X2 monitors the voltage on capacitor C7 (i.e., the output voltage of the first stage/the input voltage of the second stage), and a feedback circuit including a feedback optocoupler is used in the converter of FIG. 10. Similar elements and components in the first stages shown in FIGS. 6 and 10 and in the second stages shown in FIGS. 8 and 10 are labeled with the same reference numbers, and a description of the similar elements and components is omitted here.

The feedback circuit in FIG. 10 monitors the output voltage across the output terminals Vout+, Vout− and sends a signal corresponding to the monitored output voltage across the isolation barrier defined by the transformer TX1 using an optocoupler. The optocoupler is defined by a photo transistor Q2 and a light-emitting diode (LED) D3. The OP amp X2 monitors the voltage the capacitor C7.

The noninverting input of the OP amp X2 is connected to a node between the primary winding P1 and the capacitor C5. When the voltage on the capacitor C5 is maintained at half the voltage on capacitor C7, the IC U1 is operating at 50% duty cycle. The OP amp X2 can be connected to either the switch-output terminal SW or the node between the primary winding P1 and the capacitor C5 because the average voltages are the same. The inverting input of the OP amp X2 is connected a node between resistors R4, R5, where the resistor R5 is connected to the capacitor C7. The positive power-supply voltage of the OP amp X2 is connected to the capacitor C7, and the negative power-supply voltage of the OP amp X2 is connected to the input terminal Vin−. Resistor R3 is connected to the output of the OP amp X2 and to the feedback terminal FB. In FIG. 10, the OP amp X2 is connected across the node between the primary winding P1 and the capacitor C5 and the input terminal Vin− to amplify the difference between the signal at the node between the primary winding P1 and the capacitor C5 and the divided voltage signal of the capacitor C7 at the node between the resistors R5, R4 to maintain a fixed duty cycle. The capacitor C8 is included in the feedback circuit to help stabilize the control of the IC U1.

The feedback circuit includes an optocoupler for sending signals from the secondary side to the primary side to the feedback terminal FB of the IC U1. The optocoupler includes a photo transistor Q2 and an LED D3. The collector and emitter of the photo transistor Q2 are connected across the resistor R23 of the voltage divider defined by the resistors R23, R18. The anode of the LED D3 is connected to the output terminal Vout+ through resistor R10, and the cathode of the LED D3 is connected to the shunt regulator U3. A reference voltage is provided to the shunt regulator U3 by the voltage divider defined by resistors R11, R9 and the capacitor C10. The voltage divider defined by resistors R11, R9 is connected between the output terminals Vout+, Vout−. The capacitor C10 is connected to a node between the series-connected resistors R11, R9 and is connected to the output terminal Vout−. The on-resistance of the photo transistor Q2's is controlled by the amount of forward current in the LED D3, which cases the photo transistor Q2 to operate as a variable resistor.

Figure 11:
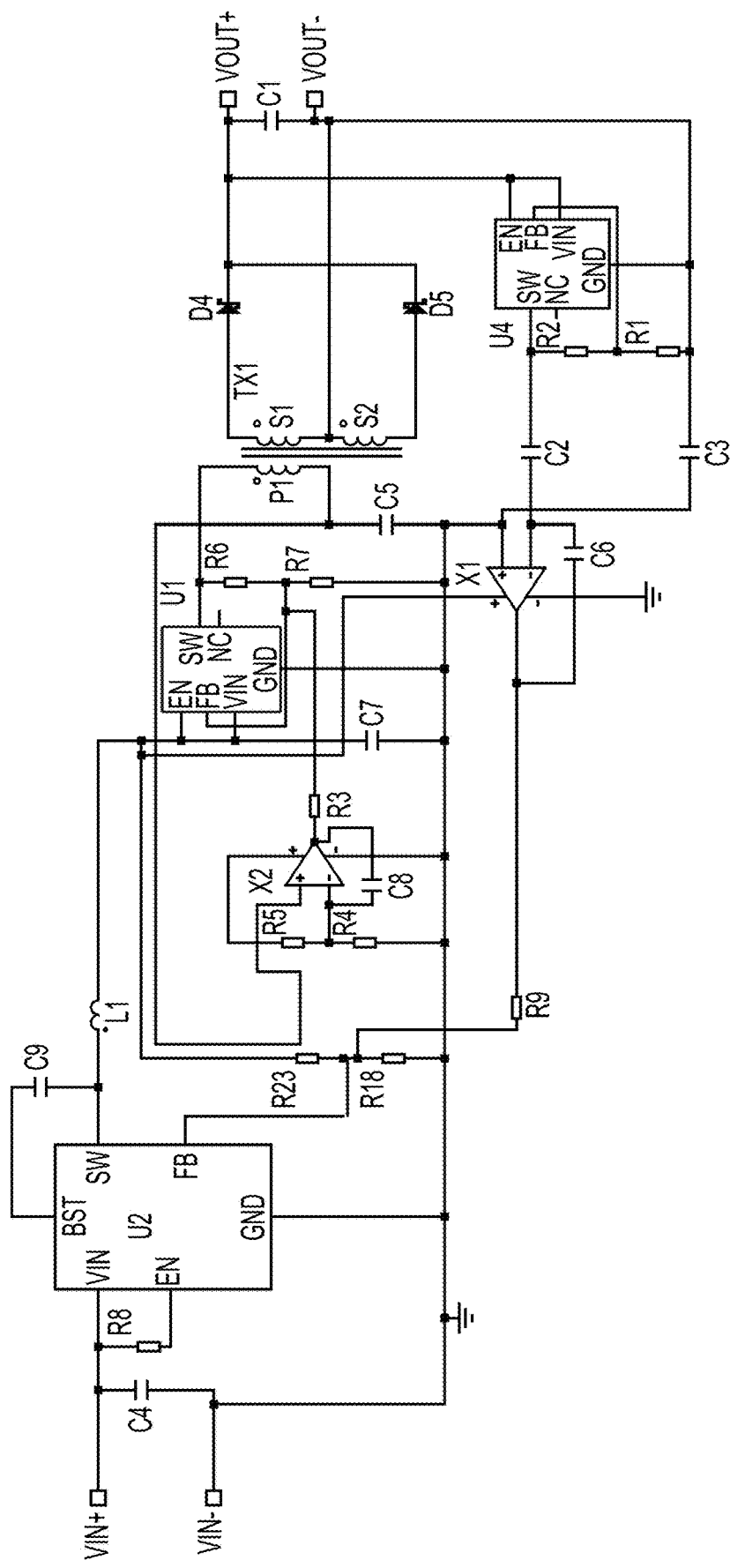
FIG. 11 shows a converter with first and second stages with regulated output provided by using isolation capacitors.

FIG. 11 shows first and second stages of a converter with a regulated output voltage that uses capacitive isolation. The first stage in FIG. 11 is similar to the first stage in FIG. 10, and the second stage in FIG. 11 is similar to the second stage in FIG. 10. The converter in FIG. 10 includes a feedback circuit that includes the IC U4 and the OP amp X3. The feedback circuit can preserve isolation between the primary and secondary sides by including capacitors C2, C3. The capacitor C2 can be connected between the OP amp X3 and the IC U4, and the capacitor C3 can be connected between the input terminal Vin− and the output terminal Vout−. The capacitors C2 and C3 can be isolation capacitors that can withstand high voltage, such as, for example, about 3 kV or about 5 kV.

The IC U4 can be the same IC as the IC U1 and can be used to monitor the output voltage at the output terminal Vout+. The IC U4 can include an input voltage terminal VIN connected to the output terminal Vout+; an enable terminal EN that is connected to the output terminal Vout+, that turns on the IC U4 when a voltage is applied, and that turns off the IC U4 when no voltage is applied; a switch-output terminal SW connected to the inverting terminal of the OP amp X3 through capacitor C2; a feedback terminal FB that monitors the switch-output terminal SW through a voltage divider defined by resistors R2, R1; and a ground terminal GND. The IC U4 can include a not-connected terminal NC that is not connected to any other element of the converter. The not-connected terminal NC can be allowed to float.

The feedback circuit includes an OP amp X3. The non-inverting input of the OP amp X3 is connected to the input terminal Vin− and the capacitor C3, and the inverting input of the OP amp X3 is connected to the switch-output terminal SW of the IC U4 through the capacitor C3. A capacitor C6 is connected across the inverting input of the OP amp X3 and the output of the OP amp X3. The positive power-supply voltage of the OP amp X3 can be connected to a node between the inductor L1 and the input voltage terminal VIN of the IC U1, and the negative power-supply voltage of the OP amp X3 can be connected to ground. Resistor R9 is connected to the output of the OP amp X3 and to the feedback terminal FB. The capacitor C6 is included to help stabilize the control of the IC U2.

The output voltage of the converter is regulated by the IC U4. The IC U4 provides duty-controlled square waveform signals to the OP amp X3 through the capacitors C2 and C3. The OP amp X3 and the capacitor C6 define an integrator because the gain of the OP amp X3 is determined by the value of capacitor C6. The output of the integrator defined by OP amp X1 and the capacitor C6 is injected into the feedback terminal FB through the resistor R9 which adjust the gain of the IC U2. A 50% duty cycle is defined by the resistors R1, R2 at the target output voltage Vout+ to provide stable operation. The duty cycle is maintained even if the output voltage Vout+ is varied, for example, if the load increases. When the duty cycle of IC U4 is higher than 50% because the output voltage of the second stage is lower that the target output voltage Vout+, then the output voltage of the first stage increases to compensate the lower output voltage of the second stage. And when the duty cycle of IC U4 is lower than 50% because the output voltage of the second stage is higher that the target output voltage Vout+, then the output voltage of the first stage decreases to compensate the higher output voltage of the second stage. Thus, the output voltage of the second stage is constant under any conditions.

Figure 12:
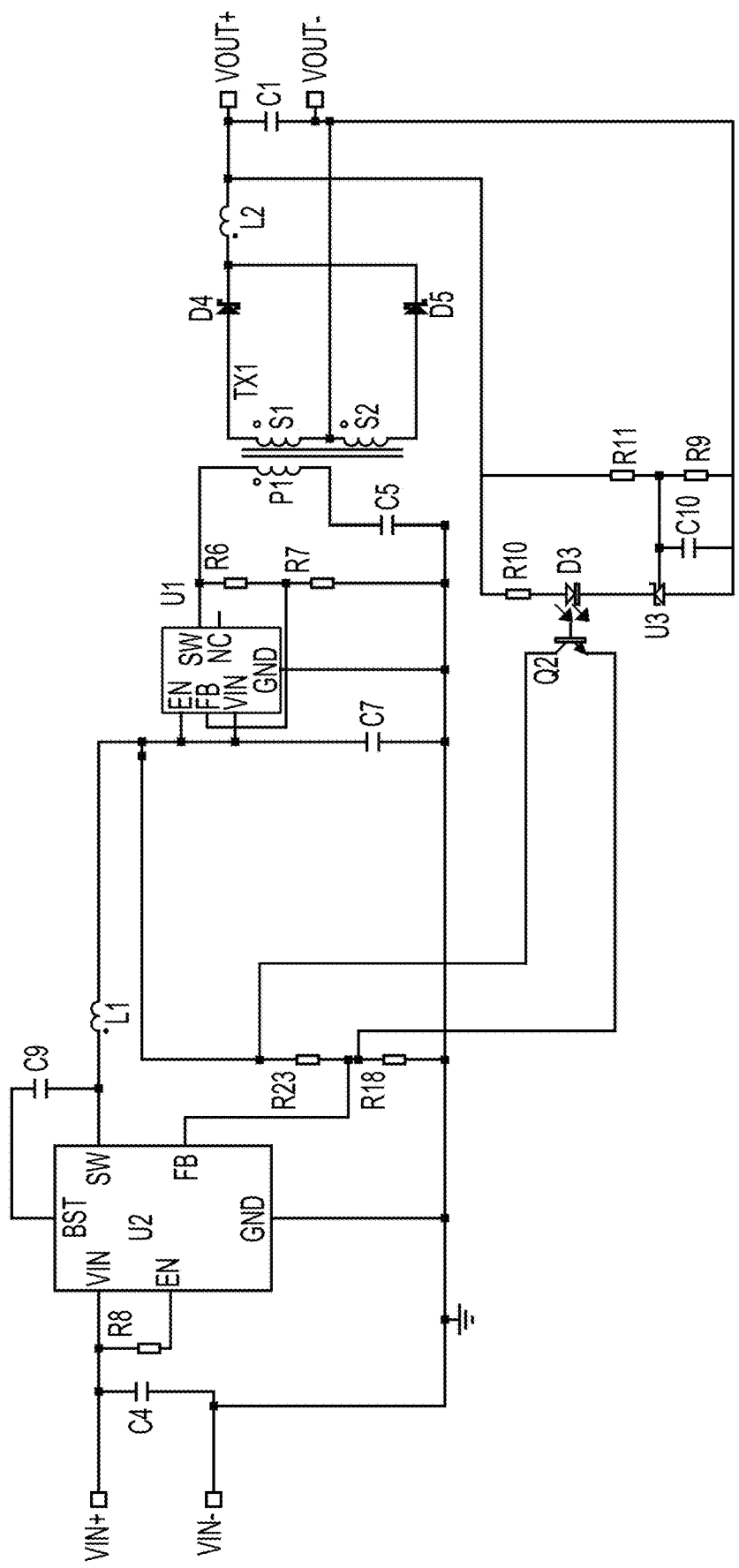
FIG. 12 shows a converter with first and second stages in which the first stage uses a feedback optocoupler to regulate the output voltage and in which an inductor is included in the secondary side.

FIG. 12 shows a converter with first and second stages similar to the first and the second stages of the converter of FIG. 10. The converter in FIG. 12 does not include the OP amp X2 and peripheral circuitry but does include an inductor L2 in the secondary circuit of the second stage. The converter of FIG. 12 cannot be used in a resonance operation because of the inductor L2.

Figure 2:
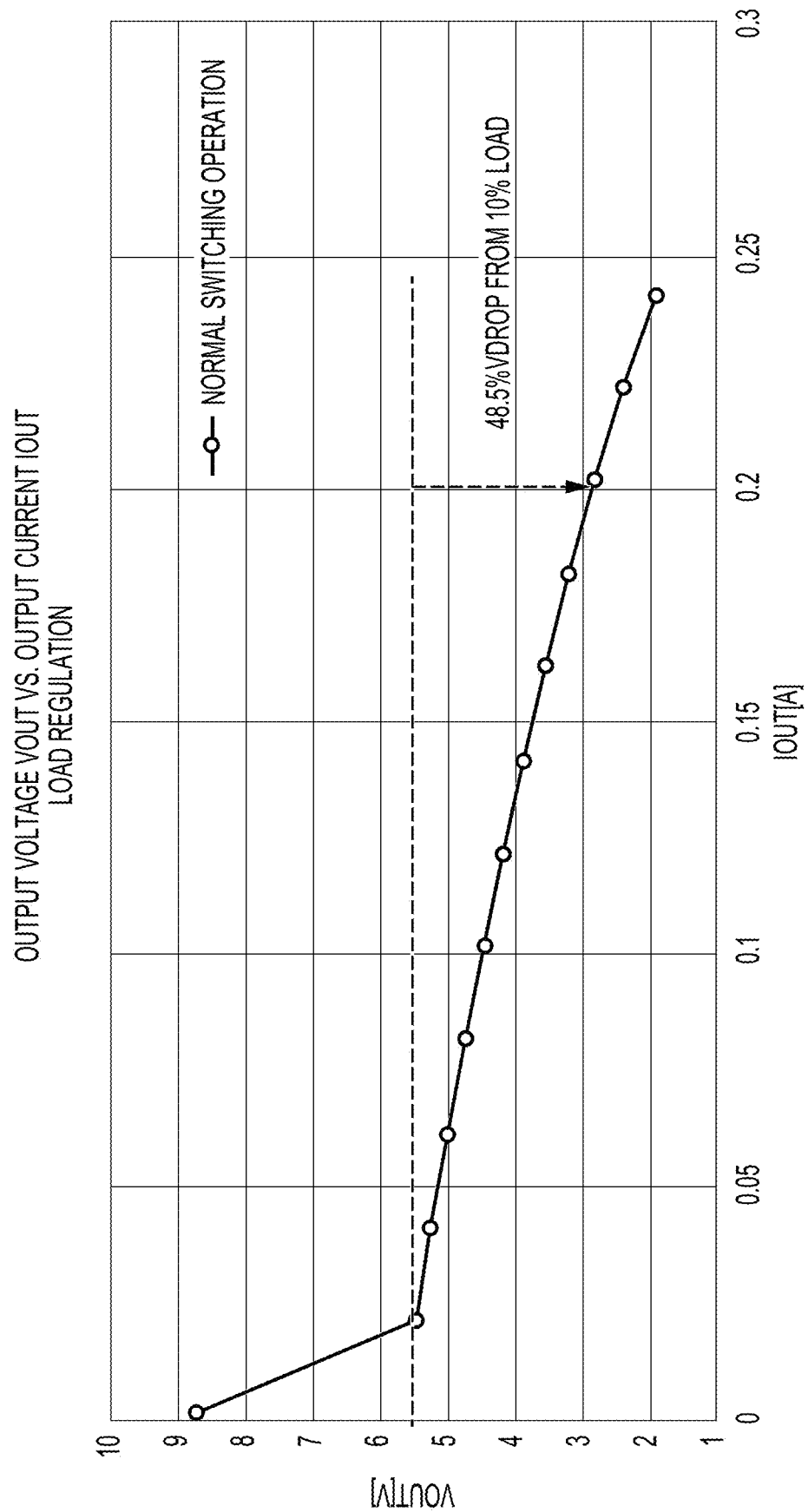
FIG. 2 shows the relationship between the output current and the output voltage of the known isolated DC-DC converter in FIG. 1.

The principal operation of the second stage of the converter of FIG. 12 is similar to the operation of converter in FIG. 1, but the switching stability can be improved by connecting the feedback terminal FB to the switch-output terminal SW as described above. That is, the effect of the LC filter on the control of the converter can be reduced or eliminated. Even though there might poor load regulation using normal switching operation (i.e., not using resonance operation) discussed with respect to FIG. 2, the poor load regulation can be compensated by the first stage. Furthermore, to keep the duty cycle fixed, the OP amp X2 and peripheral circuitry of FIG. 10 can be used in the second stage circuit to boost efficiency.

Figure 13:
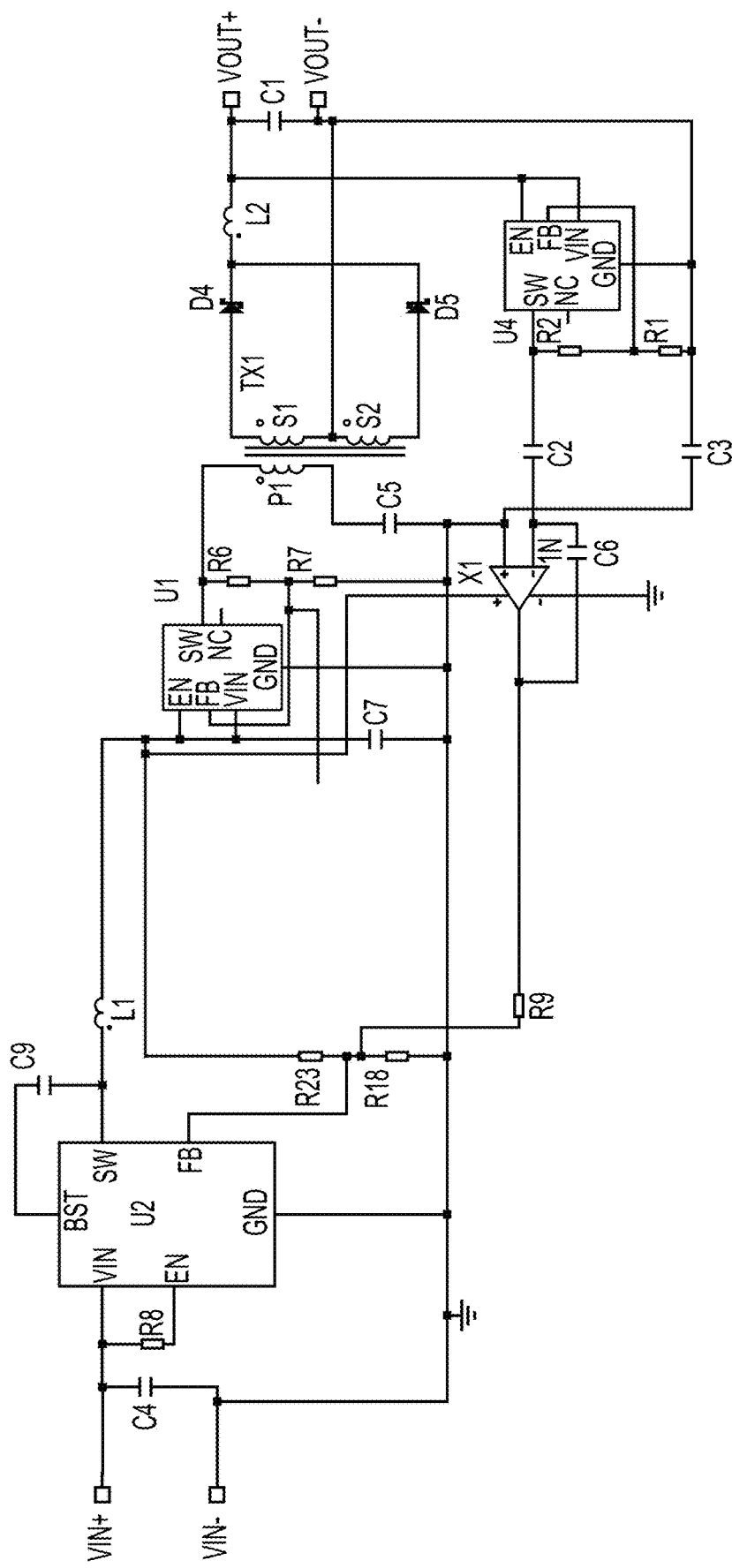
FIG. 13 shows a converter with first and second stages in which an inductor is included in the secondary side and in which an OP-amp integrator is used to provide feedback.

FIG. 13 shows a converter with first and second stages similar to the first and the second stages of the converter of FIG. 11. The converter in FIG. 13 does not include the OP amp X2 and peripheral circuitry but does include an inductor L2 in the secondary circuit of the second stage. As with the converter in FIG. 12, the converter of FIG. 13 cannot be used in a resonance operation.

Figure 14:
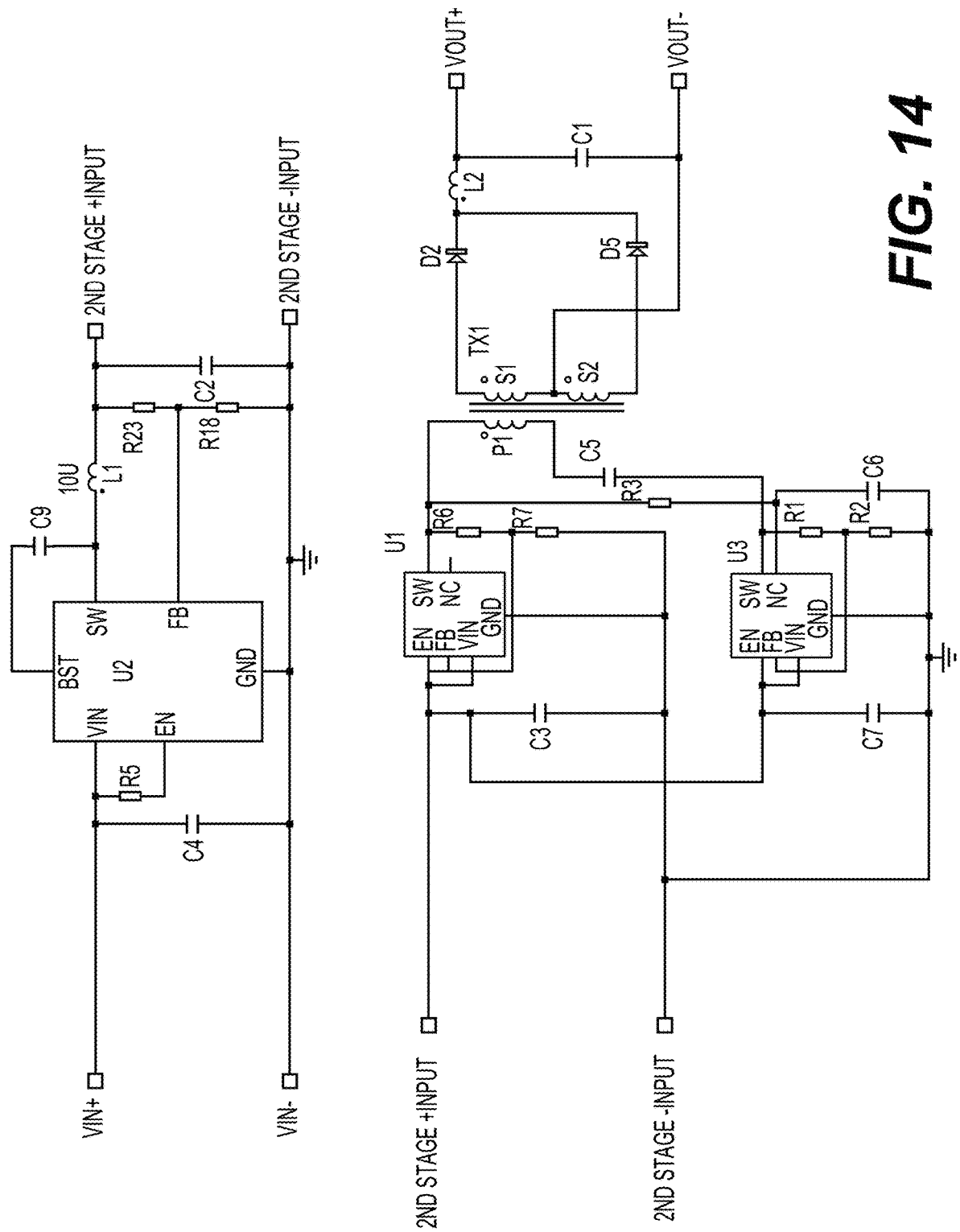
FIG. 14 shows a converter with first and second stages in which the second stage includes two POL ICs arranged in phase-shift, full-bridge topology.

FIG. 14 shows a converter with first and second stages. The first stage of FIG. 14 is similar to the first stage of FIG. 6. The second stage includes IC U1 and IC U3 arranged in phase-shift, full-bridge topology. The switching of IC U1 and IC U3 can be synchronized using the sync function of IC U3. The IC U1 can be the master, and the IC U3 can be the slave. The phase between the IC U1 and the IC U2 can be shifted by a signal delay using an internal circuit of the IC U1 along with the resistor R3 and the capacitor C6. Load regulation of the converter can be improved by adding the OP-amp load-compensation circuit, the optocoupler feedback, or the POL IC feedback shown in FIGS. 8, 9, 10 and 11. In the converter of FIG. 14, the duty of each of IC U1 and IC U3 can be controlled by OP amps to keep 50% duty under any conditions.

The converters discussed above, except for the phase-shift, full-bridge converter of FIG. 14 can use different primary and secondary circuits. FIGS. 15-21 show different examples of secondary and primary circuits that can be used. Any combination of these primary and secondary circuit can be used in the converters discussed above, except for the phase-shift, full-bridge converter of FIG. 14. In addition, the diodes in FIGS. 15-19 can be replaced by field-effect transistors (FETs) to increase efficiency.

Figure 15:
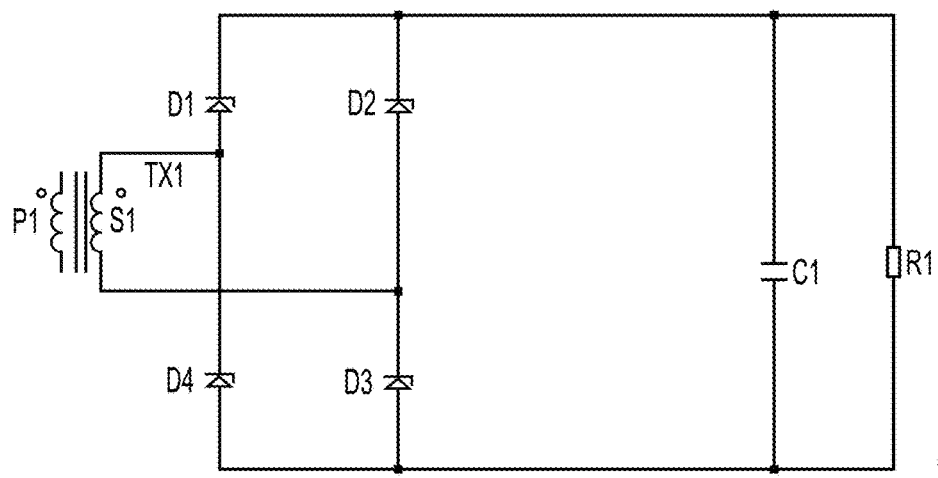
FIG. 15 shows a secondary circuit with a full-bridge rectifier.
Figure 16:
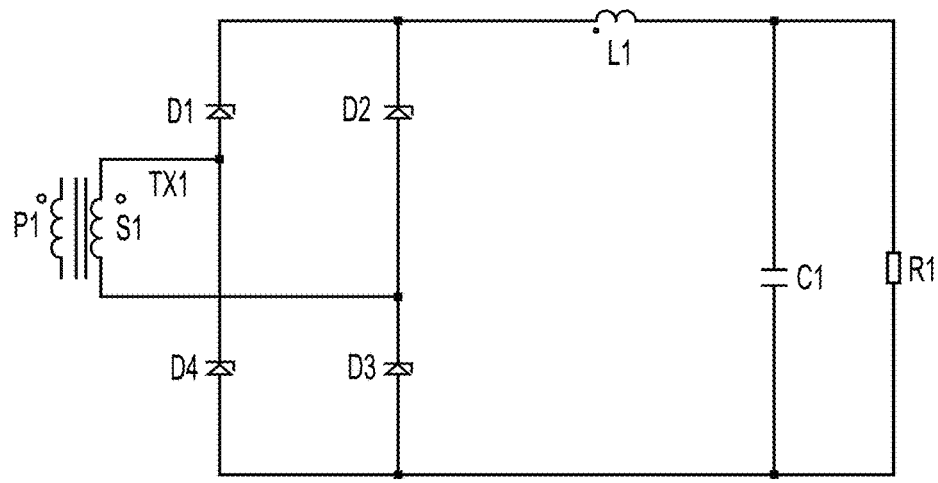
FIG. 16 shows a secondary circuit with a full-bridge rectifier and an inductor.

FIG. 15 shows a secondary circuit with a full-bridge rectifier connected to the secondary winding S1 and the output capacitor C1. The full-bridge rectifier is defined by diodes D1, D2, D3, and D4. The resistor R1 represents the load. FIG. 16 shows a secondary circuit similar to the secondary circuit of FIG. 15, but the full-bridge rectifier is connected to the inductor L1. The cathodes of diodes D1 and D2 are connected to the inductor L1.

Figure 17:
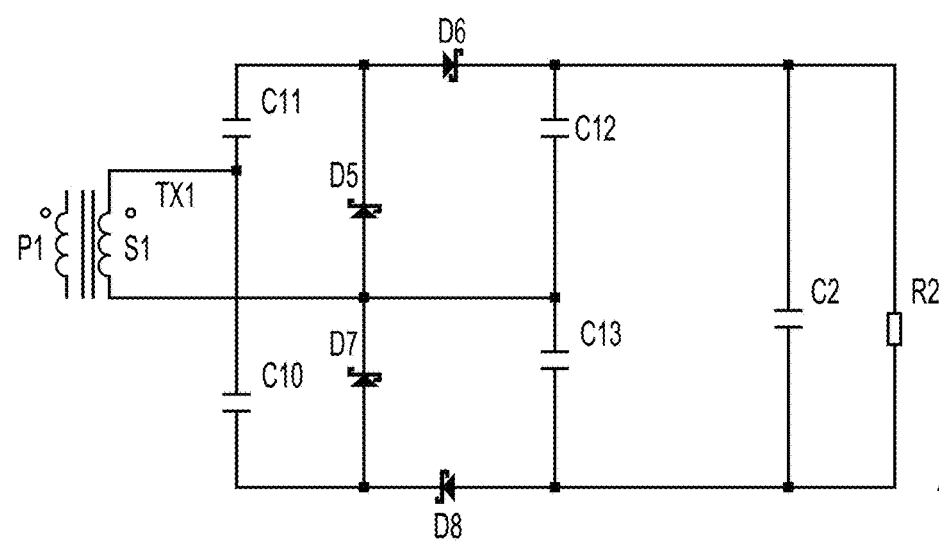
FIG. 17 shows a secondary circuit with a voltage quadrupler circuit.
Figure 18:
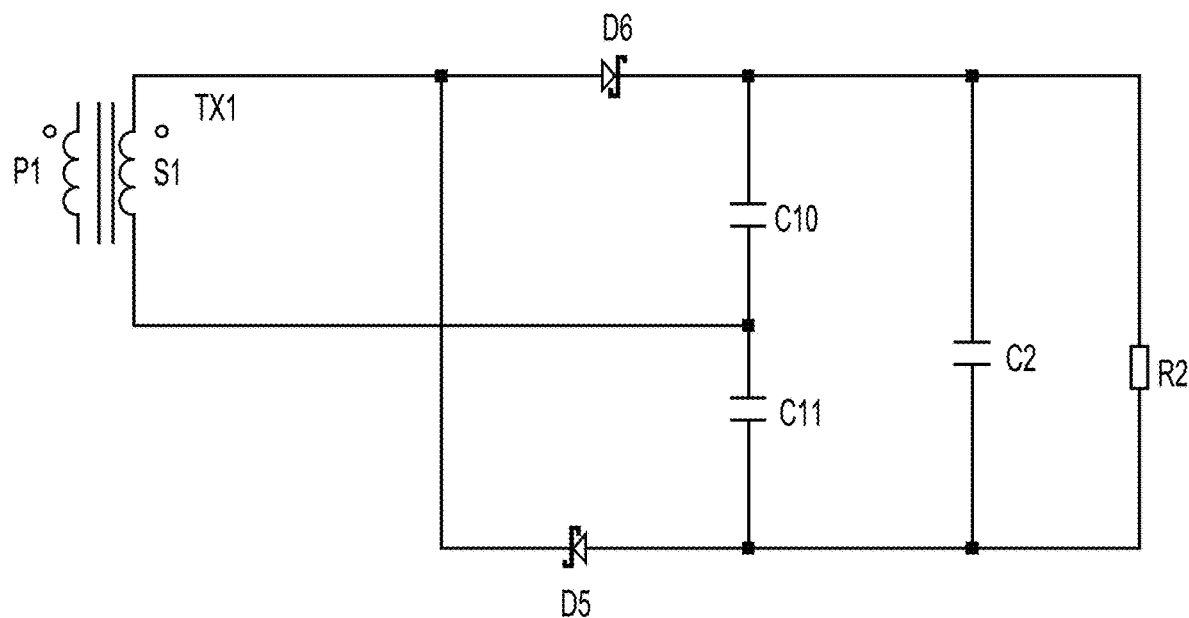
FIG. 18 shows a secondary circuit with a voltage doubler circuit.
Figure 19:
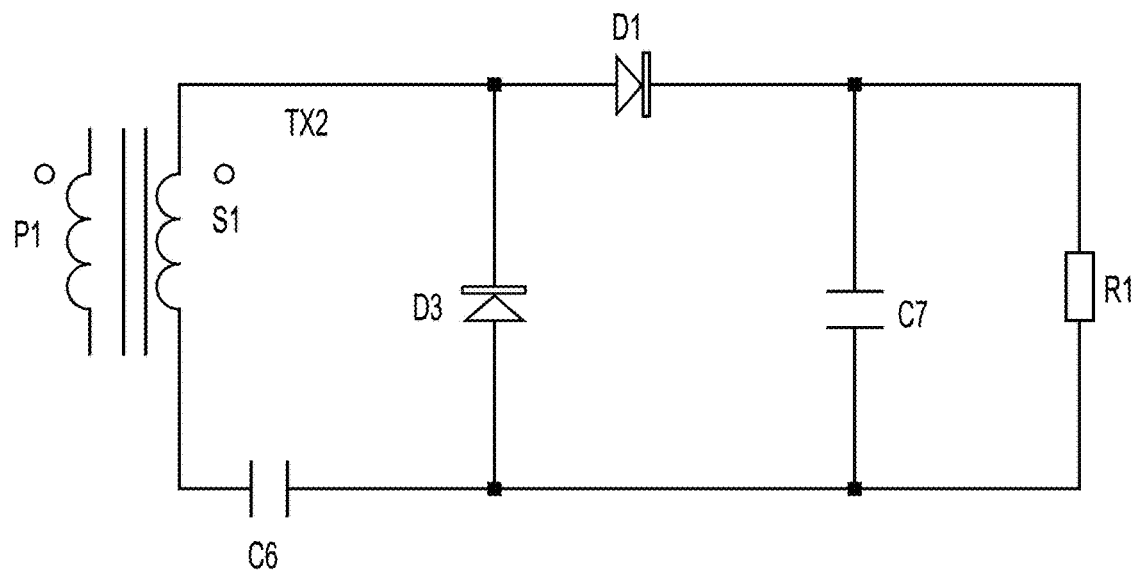
FIG. 19 shows a secondary circuit with another voltage doubler circuit.

FIG. 17 shows a secondary circuit including capacitors C10-C13 and diodes D5-D8 arranged as a voltage quadrupler circuit. The voltage quadrupler circuit is connected to the output capacitor C2. The resistor R2 represents the load. FIG. 18 shows a secondary circuit including capacitors C10, C11 and diodes D5, D6 arranged as a voltage-doubler circuit. The voltage-doubler circuit is connected to output capacitor C2. FIG. 19 shows a secondary circuit including capacitors C6, C7 and diodes D1, D3 arranged in another voltage-doubler circuit. FIG. 19 includes one less component than FIG. 18 as only one capacitor is need, but when the diode D3 is conducting, current only flow into capacitor C6. In contrast, FIG. 18 includes the additional capacitor, but when the diode D5 is conducting, current flows not only into C11 but also from capacitor C10. Thus, the voltage double of FIG. 18 is more expensive but more efficient than the voltage double of FIG. 19.

Figure 20:
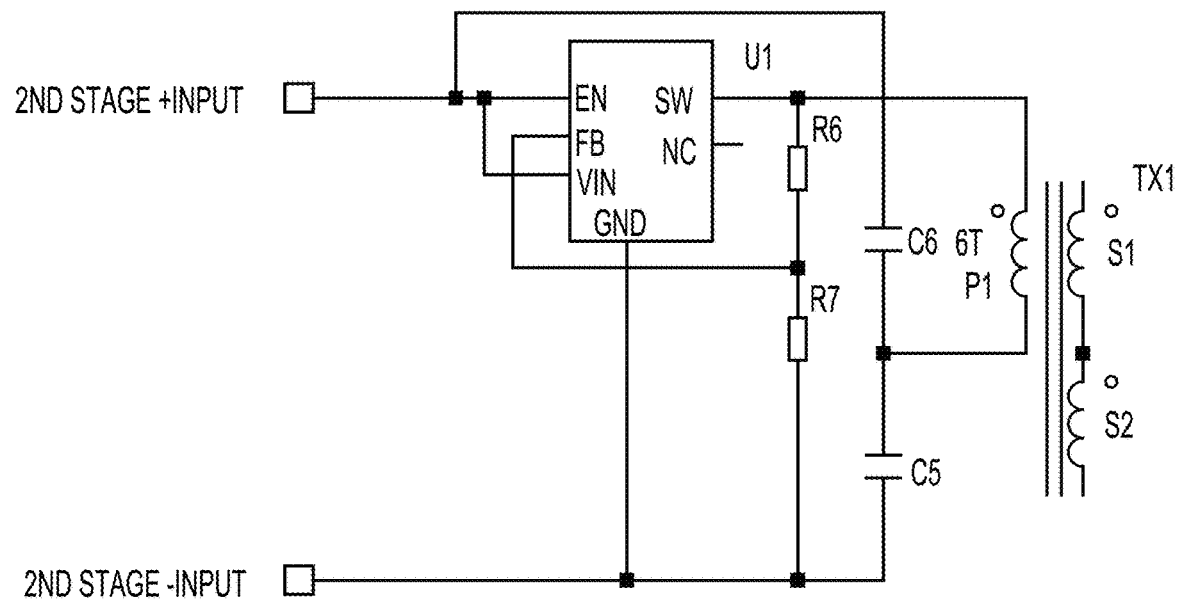
FIG. 20 shows a primary circuit of a second stage of a converter with a capacitive divider.
Figure 21:
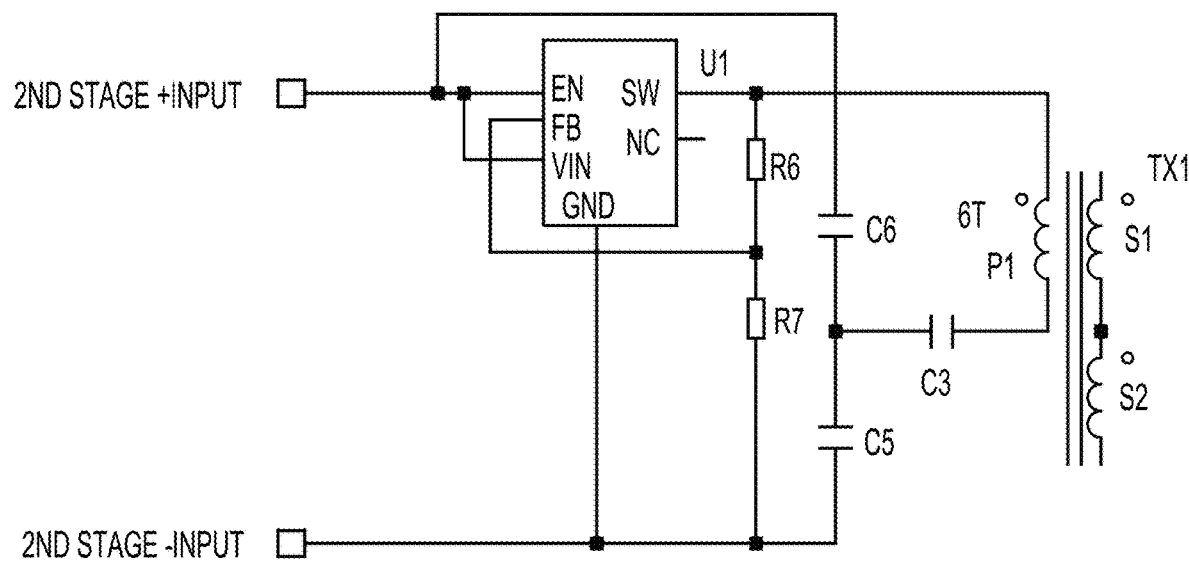
FIG. 21 shows a primary circuit of a second stage of a converter with a capacitive divider and a resonant capacitor.

FIG. 20 shows a primary circuit of a second stage of a converter with a capacitive divider. The capacitor divider includes capacitors C5, C6 connected in series with each other and across the input terminals +input, −input. A node between the capacitors C5, C6 is connected to the primary winding P1. When the low-side switch in IC U1 is on, current is from both capacitors C5 and C6, instead of only capacitor C5. Sharing current between capacitors C5 and C6 improves efficiency. FIG. 21 shows a primary circuit of a second stage of a converter similar to the primary circuit of FIG. 20. The primary circuit in FIG. 21 additionally includes a resonant capacitor C3 connected to the node between the capacitors C5, C6 and the primary winding P1.

The converter discussed above can be used with any boost converter technology such as LED boost converter technology and wireless charging technology.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A converter comprising:
   first and second input terminals;
   an integrated circuit (IC) that is a non-resonant, step-down, and point-of-load IC, that is connected to the first and second input terminals, and that includes a feedback terminal and switch-output terminal;
   a voltage-sense circuit connected to the feedback terminal and the switch-output terminal;
   a transformer that includes a primary winding connected to the switch-output terminal;
   a capacitor connected in series with the primary winding;
   a rectifier connected to a secondary winding of the transformer; and
   first and second output terminals connected to the rectifier; wherein
   the converter is operated in a resonate mode;
   the voltage-sense circuit includes a voltage divider defined by first and second resistors connected in series with each other;
   the first resistor is directly connected to the switch-output terminal; and
   a node between the first and the second resistors is connected to the feedback terminal to keep a voltage on the feedback terminal constant.

2. The converter of claim 1, wherein a signal received by the feedback terminal from the voltage-sense circuit causes the IC to provide a 50% duty cycle or an approximately 50% duty cycle.

3. The converter of claim 1, wherein a resonant circuit defined by a leakage inductance of the primary winding and the capacitor resonates.

4. The converter of claim 1, further comprising a pre-regulator connected to the first and the second input terminals.

5. The converter of claim 4, wherein the pre-regulator includes:
   pre-regulator IC that includes a feedback terminal and a switch-output terminal; and
   a pre-regulator voltage-sense circuit that is connected to the switch-output terminal of the pre-regulator IC through an inductor and that is connected to the feedback terminal of the pre-regulator IC.

6. The converter of claim 5, further including a feedback circuit connected to the first and the second output terminals and connected to the pre-regulator IC.

7. The converter of claim 6, wherein the feedback circuit includes feedback IC connected to the first and the second output terminals.

8. The converter of claim 6, wherein the feedback circuit includes an optocoupler.

9. The converter of claim 8, wherein the optocoupler includes a photo transistor and a light-emitting diode.

10. The converter of claim 8, wherein the optocoupler includes first and second capacitors.

11. The converter of claim 4, further comprising a load compensation circuit.

12. The converter of claim 1, wherein the rectifier is a full-bridge rectifier.

13. The converter of claim 12, wherein the full-bridge rectifier is connected to an inductor.

14. The converter of claim 1, wherein the rectifier includes a voltage-doubler circuit or a voltage-quadrupler circuit.

15. The converter of claim 1, further comprising a capacitive divider connected to the primary winding.

16. A converter comprising:
    first and second input terminals;
    an integrated circuit (IC) that is a non-resonant, step-down, and point-of-load IC, that is connected to the first and second input terminals, and that includes a feedback terminal and switch-output terminal;
    a voltage-sense circuit connected to the feedback terminal and the switch-output terminal;
    a transformer that includes a primary winding connected to the switch-output terminal;
    a capacitor connected in series with the primary winding;
    a rectifier connected to a secondary winding of the transformer; and
    first and second output terminals connected to the rectifier;
    an additional IC that is a non-resonant, step-down, and point-of-load IC, that is connected to the first and second input terminals, and that includes a feedback terminal and switch-output terminal; wherein
    the converter is operated in a resonate mode;
    the IC and the additional IC are arranged in a phase-shift, full-bridge topology.

17. A converter comprising:
    first and second input terminals;
    an integrated circuit (IC) that is a non-resonant, step-down, and point-of-load IC, that is connected to the first and second input terminals, and that includes a feedback terminal and switch-output terminal;
    a voltage-sense circuit that is connected to the feedback terminal and that is directly connected to the switch-output terminal;
    a transformer that includes a primary winding connected to the switch-output terminal;
    a capacitor connected in series with the primary winding;
    a rectifier connected to a secondary winding of the transformer; and
    first and second output terminals connected to the rectifier; wherein
    the voltage-sense circuit includes a voltage divider defined by first and second resistors connected in series with each other;
    the first resistor is directly connected to the switch-output terminal; and
    a node between the first and the second resistors is connected to the feedback terminal to keep a voltage on the feedback terminal constant.

18. The converter of claim 17, further comprising an inductor connected to the rectifier.

\* \* \* \* \*